(12) United States Patent
Schubert et al.

(10) Patent No.: US 10,756,348 B2
(45) Date of Patent: Aug. 25, 2020

(54) USE OF CERTAIN POLYMERS AS A CHARGE STORE

(71) Applicant: Evonik Operations GmbH, Essen (DE)

(72) Inventors: Ulrich Schubert, Jena (DE); Andreas Wild, Haltern am See (DE); Bernhard Haeupler, Hof (DE)

(73) Assignee: Evonik Operations GmbH, Essen (DE)

( * ) Notice: Subject to any disclaimer, the term of this patent is extended or adjusted under 35 U.S.C. 154(b) by 154 days.

(21) Appl. No.: 15/568,871

(22) PCT Filed: Aug. 8, 2016

(86) PCT No.: PCT/EP2016/068862
§ 371 (c)(1),
(2) Date: Oct. 24, 2017

(87) PCT Pub. No.: WO2017/032582
PCT Pub. Date: Mar. 2, 2017

(65) Prior Publication Data
US 2018/0102541 A1    Apr. 12, 2018

(30) Foreign Application Priority Data

Aug. 26, 2015    (EP) .................................. 15182456

(51) Int. Cl.
*H01M 4/60*        (2006.01)
*C08G 59/24*       (2006.01)
(Continued)

(52) U.S. Cl.
CPC .......... *H01M 4/606* (2013.01); *C08G 59/245* (2013.01); *C08G 65/22* (2013.01); *H01G 11/48* (2013.01);
(Continued)

(58) Field of Classification Search
CPC ...... H01M 4/60; H01M 10/052; H01M 4/606; C08G 59/24; C08G 59/245; C08G 65/22; H01G 11/48; Y02E 60/13
See application file for complete search history.

(56) References Cited

U.S. PATENT DOCUMENTS

| 2,739,160 A | 3/1956 | Bell et al. |
| 4,999,263 A | 3/1991 | Kabata et al. |
| (Continued) | | |

FOREIGN PATENT DOCUMENTS

| CN | 101401234 A | 4/2009 |
| CN | 101632198 A | 1/2010 |
| (Continued) | | |

OTHER PUBLICATIONS

JPH11323094 MT (Year: 1999).*
(Continued)

*Primary Examiner* — Alexander Usyatinsky
(74) *Attorney, Agent, or Firm* — Oblon, McClelland, Maier & Neustadt, L.L.P.

(57) ABSTRACT

The present invention relates to polymers and to the use thereof in the form of active electrode material or in an electrode slurry as electrical charge storage means, the electrical charge storage means especially being secondary batteries. The secondary batteries are especially notable for high cell voltages, a small drop in capacity even on undergoing several charging and discharging cycles, and simple and scalable processing and production methods (for example by means of screen printing).

7 Claims, 1 Drawing Sheet

Figure 1:
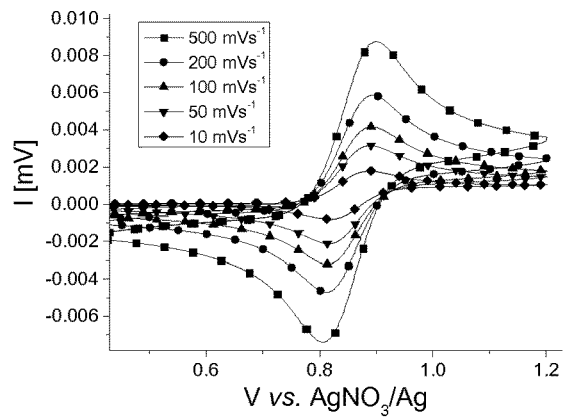

(51) Int. Cl.
*H01G 11/48* (2013.01)
*C08G 65/22* (2006.01)
*H01M 10/052* (2010.01)

(52) U.S. Cl.
CPC .......... *H01M 4/60* (2013.01); *H01M 10/052* (2013.01); *Y02E 60/13* (2013.01)

(56) References Cited

U.S. PATENT DOCUMENTS

| | | | |
|---|---|---|---|
| 5,817,887 A | 10/1998 | Leppard et al. | |
| 6,395,429 B1 | 5/2002 | Kang et al. | |
| 6,924,067 B1 | 8/2005 | Ito et al. | |
| 2002/0034690 A1 | 3/2002 | Ono | |
| 2002/0041995 A1 | 4/2002 | Bannai et al. | |
| 2002/0041996 A1 | 4/2002 | Morioka et al. | |
| 2003/0062080 A1 | 4/2003 | Satoh et al. | |
| 2003/0096165 A1* | 5/2003 | Nakahara | H01M 4/13 429/213 |
| 2005/0164063 A1 | 7/2005 | Wariishi et al. | |
| 2005/0170247 A1* | 8/2005 | Nakahara | H01M 4/13 429/213 |
| 2005/0260500 A1 | 11/2005 | Iwasa et al. | |
| 2007/0027302 A1 | 2/2007 | Nakamura et al. | |
| 2008/0269360 A1 | 10/2008 | Itoh et al. | |
| 2009/0161295 A1 | 6/2009 | Kuroda et al. | |
| 2010/0167129 A1 | 7/2010 | Wu et al. | |
| 2010/0233537 A1 | 9/2010 | Nesvadba et al. | |
| 2010/0255372 A1* | 10/2010 | Suguro | C08F 216/1458 429/213 |
| 2011/0006294 A1 | 1/2011 | Tanaka et al. | |
| 2011/0020710 A1 | 1/2011 | Iwayasu | |
| 2011/0129730 A1 | 6/2011 | Kasai et al. | |
| 2012/0095179 A1 | 4/2012 | Nishide et al. | |
| 2012/0100437 A1 | 4/2012 | Nakahara et al. | |
| 2012/0171561 A1 | 7/2012 | Iwasa et al. | |
| 2012/0187387 A1 | 7/2012 | Sekiguchi et al. | |
| 2012/0189919 A1 | 7/2012 | Abe et al. | |
| 2013/0183782 A1 | 7/2013 | Mima | |
| 2013/0189571 A1 | 7/2013 | Abouimrane et al. | |
| 2013/0209878 A1 | 8/2013 | Nakahara et al. | |
| 2013/0224538 A1 | 8/2013 | Jansen et al. | |
| 2013/0288137 A1 | 10/2013 | Weng et al. | |
| 2014/0038036 A1* | 2/2014 | Nishide | H01M 4/602 429/188 |
| 2014/0048786 A1* | 2/2014 | Suzuka | H01L 31/02242 257/40 |
| 2014/0057167 A1 | 2/2014 | Kasai et al. | |
| 2014/0061532 A1 | 3/2014 | Nishide et al. | |
| 2014/0079984 A1 | 3/2014 | Kajitani et al. | |
| 2014/0087235 A1 | 3/2014 | Kajitani et al. | |
| 2015/0025213 A1 | 1/2015 | Yasumatsu et al. | |
| 2015/0197657 A1 | 7/2015 | Niederst et al. | |

FOREIGN PATENT DOCUMENTS

| | | |
|---|---|---|
| CN | 102651486 A | 8/2012 |
| CN | 102683744 A | 9/2012 |
| DE | 231 455 A1 | 12/1985 |
| DE | 195 32 574 A1 | 3/1997 |
| EP | 0 167 321 A1 | 1/1986 |
| EP | 0 420 699 A2 | 4/1991 |
| EP | 1 128 453 A2 | 8/2001 |
| GB | 1 454 336 A | 11/1976 |
| JP | 49-117598 A | 11/1974 |
| JP | 3-128931 A | 5/1991 |
| JP | 7-109351 A | 4/1995 |
| JP | 11-323094 A | 11/1999 |
| JP | H11323094 * | 12/1999 |
| JP | 2000-30530 A | 1/2000 |
| JP | 2000-77095 A | 3/2000 |
| JP | 2001-338527 A | 12/2001 |
| JP | 2002-117852 A | 4/2002 |
| JP | 2002-117854 A | 4/2002 |
| JP | 2002-117855 A | 4/2002 |
| JP | 2002-226513 A | 8/2002 |
| JP | 2002-298850 A | 10/2002 |
| JP | 2002-313344 A | 10/2002 |
| JP | 2002-319314 A | 10/2002 |
| JP | 2003-243026 A | 8/2003 |
| JP | 2003-272701 A | 9/2003 |
| JP | 2003-277442 A | 10/2003 |
| JP | 2004-63114 A | 2/2004 |
| JP | 2004-179169 A | 6/2004 |
| JP | 2004-200059 A | 7/2004 |
| JP | 2004-259618 A | 9/2004 |
| JP | 2004-263153 A | 9/2004 |
| JP | 2004-331537 A | 11/2004 |
| JP | 2005-8689 A | 1/2005 |
| JP | 2005-11562 A | 1/2005 |
| JP | 2006-152290 A | 6/2006 |
| JP | 2006-236837 A | 9/2006 |
| JP | 2006-344504 A | 12/2006 |
| JP | 2007-123171 A | 5/2007 |
| JP | 2007-236142 A | 9/2007 |
| JP | 2008-166199 A | 7/2008 |
| JP | 2008-218326 A | 9/2008 |
| JP | 2008-234909 A | 10/2008 |
| JP | 2008-296436 A | 12/2008 |
| JP | 2009-205918 A | 9/2009 |
| JP | 2009-217992 A | 9/2009 |
| JP | 2009-230951 A | 10/2009 |
| JP | 2009-238612 A | 10/2009 |
| JP | 2009-298873 A | 12/2009 |
| JP | 2010-55923 A | 3/2010 |
| JP | 2010-77303 A | 4/2010 |
| JP | 2010-114042 A | 5/2010 |
| JP | 2010-163551 A | 7/2010 |
| JP | 2010-212152 A | 9/2010 |
| JP | 2010-238403 A | 10/2010 |
| JP | 2010-266556 A | 11/2010 |
| JP | 2010-282154 A | 12/2010 |
| JP | 2011-40311 A | 2/2011 |
| JP | 2011-74317 A | 4/2011 |
| JP | 2011-138037 A | 7/2011 |
| JP | 2011-165433 A | 8/2011 |
| JP | 2011-231153 A | 11/2011 |
| JP | 2011-252106 A | 12/2011 |
| JP | 2012-79639 A | 4/2012 |
| JP | 2012-190545 A | 10/2012 |
| JP | 2012-219109 A | 11/2012 |
| JP | 2012-221574 A | 11/2012 |
| JP | 2012-221575 A | 11/2012 |
| JP | 2012-224758 A | 11/2012 |
| JP | 2013-98217 A | 5/2013 |
| WO | WO 2004/058679 A2 | 7/2004 |
| WO | WO 2004/077593 A1 | 9/2004 |
| WO | WO 2004/098745 A1 | 11/2004 |
| WO | WO 2007/141913 A1 | 12/2007 |
| WO | WO 2008/099557 A1 | 8/2008 |
| WO | WO 2009/038125 A1 | 3/2009 |
| WO | WO 2009/145225 A1 | 12/2009 |
| WO | WO 2010/002002 A1 | 1/2010 |
| WO | WO 2010/104002 A1 | 9/2010 |
| WO | WO 2010/140512 A1 | 12/2010 |
| WO | WO 2011/034117 A1 | 3/2011 |
| WO | WO 2011/068217 A1 | 6/2011 |
| WO | WO 2011/149970 A2 | 12/2011 |
| WO | WO 2012/029556 A1 | 3/2012 |
| WO | WO 2012/120929 A1 | 9/2012 |
| WO | WO 2012/133202 A1 | 10/2012 |
| WO | WO 2012/133204 A1 | 10/2012 |
| WO | WO 2012/153865 A1 | 11/2012 |
| WO | WO 2012/153866 A1 | 11/2012 |
| WO | WO 2013/099567 A1 | 7/2013 |
| WO | 2014/025411 A1 | 2/2014 |

OTHER PUBLICATIONS

Decision of SIPO to grant a Patent (Year: 2020).*
16750793,Decision_to_grant_a_European_patent,Nov. 29, 2018 (Year: 2018).*
Decision of JPO to grant a Patent (Year: 2019).*

(56) References Cited

OTHER PUBLICATIONS

U.S. Appl. No. 14/903,864, filed Jan. 8, 2016, US-2016-0233509 A1, B. Häupler, et al.
U.S. Appl. No. 15/123,071, filed Sep. 1, 2016, US-2017-0114162 A1, B. Häupler, et al.
U.S. Appl. No. 15/129,910, filed Sep. 28, 2016, US-2017-0179525 A1, B. Häupler, et al.
U.S. Appl. No. 15/247,434, filed Aug. 25, 2016, US-2017-0058062 A1, U. Schubert, et al.
U.S. Appl. No. 15/247,346, filed Aug. 25, 2016, US-2017-0062825 A1, U. Schubert, et al.
U.S. Appl. No. 15/568,884, filed Oct. 24, 2017, U. Schubert, et al.
Alexandru Vlad, et al., "Melt-Polymerization of TEMPO Methacrylates with Nano Carbons Enables Superior Battery Materials" ChemSusChem, vol. 8, 2015, pp. 1692-1696.
H. Hopff, et al., "On 2-vinylthianthrene and its polymerization products" Makromolekul. Chem. 1963, 60, 129 (with English language translation).
Harry R. Allcock, et al., "The synthesis and applications of novel aryloxy/oligoethyleneoxy substituted polyphosphazenes as solid polymer electrolytes", Solid State Ionics, vol. 156, 2003, pp. 401-414.
P. Baum, et al., Novel cation conductors based on rigid-rod poly(p-phenylene)s, Polymer, vol. 41, 2000, pp. 965-973.
Craig J. Hawker et al., "Hyperbranched Poly(ethylene glycol)s: A New Class of Ion-Conducting Materials", Macromolecules, vol. 29, 1996, pp. 3831-3838.
Ying-Pin Huang, et al., "Polymer Electrolyte Containing Dialkoxyacenes with Oligo(ethylene oxide) Side Chains", Journal of the Chinese Chemical Society, vol. 53, 2006, pp. 1335-1342.
Takahito Itoh, et al., "Polymer Electrolytes Plasticized With Hyperbranched Polymer for Lithium Polymer Batteries" Ionics, vol. 10, 2004, pp. 450-457.
Takahito Itoh, et al., "Polymer electrolytes based on hyperbranched polymers", Journal of Power Sources, vol. 97-98, 2001, pp. 637-640.
Takahito Itoh, et al., "Composite polymer electrolytes of poly(ethylene oxide)/$BaTiO_3$/Li salt with hyperbranched polymer" Journal of Power Sources, vol. 119-121, 2003, pp. 403-408.
Takahito Itoh, et al., "Polymer electrolytes based on hyperbranched polymer with cross-linkable groups at the terminals", Journal of Power Sources, vol. 146, 2005, pp. 371-375.
Takahito Itoh, et al., "Solid polymer electrolytes based on comblike polymers", Journal of Power Sources, vol. 163, 2006, pp. 252-257.
Takahito Itoh, et al., "Properties of the cross-linked composite polymer electrolytes using hyperbranched polymer with terminal acryloyl groups", Journal of Power Sources, vol. 174, 2007, pp. 1167-1171.
Takahito Itoh, et al., "Anhydrous proton-conducting electrolyte membranes based on hyperbranched polymer with phosphonic acid groups for high-temperature fuel cells", Journal of Power Sources, vol. 178, 2008, pp. 627-633.
Takahito Itoh, et al., "Composite Polymer Electrolytes Based on Hyperbranched Polymer and Application to Lithium Polymer Batteries", Solid State Ionics, 2002, pp. 215-236.
Takahito Itoh, et al., "Composite polymer electrolytes based on poly(ethylene oxide), hyperbranched polymer, $BaTiO_3$ and $LiN(CF_3SO_2)_2$" Solid State Ionics, vol. 156, 2003, pp. 393-399.
Takahito Itoh, et al., "Ionic Conductivity and Mechanical Property of Cross-linked Hyperbranched Polymer Electrolytes for Lithium Secondary Batteries", Transactions of the Material Research Society of Japan, vol. 29, No. 3, May 2004, pp. 1025-1030 and cover sheet.
Takahito Itoh, et al., "Proton-conducting electrolyte membranes based on hyperbranched polymer with a sulfonic acid group for high-temperature fuel cells", Electrochimica Acta, vol. 55, 2010, pp. 1419-1424.
Takahito Itoh, "Hyperbranched Polymer-Based Electrolyte for Lithium Polymer Batteries" Journal of Fudan University (Natural Science), vol. 44, No. 5, 2005, pp. 664-665.
Thomas Jähnert, et al., "Polymers Based on Stable Phenoxyl Radicals for the Use in Organic Radical Batteries", Macromolecular Rapid Communications, vol. 35, 2014, pp. 882-887.
Lu Zhang, et al., "Molecular engineering towards safer lithium-ion batteries: a highly stable and compatible redox shuttle for overcharge protection", Energy & Environmental Science, vol. 5, 2012, pp. 8204-8207.
Houshang Karimi, et al., "Electrochemistry of Tetracyanoquinodimethane Polymer-Modified Electrodes", Journal of Electroanalytical Chemistry, vol. 217, 1987, pp. 313-329.
Kunsoo Kim, et al., "Synthesis and Optical Properties of Poly(p-phenylene) Electrolyte Attached with Oligo(ethylene oxide) Side Chains" Polymer (Korea), vol. 23, No. 5, 1999, pp. 1-11 (with English Abstract and English language translation).
U. Lauter, et al., "Molecular Composites from Rigid-Rod Poly(p-phenylene)s with Oligo(oxyethylene) Side Chains as Novel Polymer Electrolytes" Macromolecules, vol. 30, No. 7, 1997, pp. 2092-2101.
Masashi Matsumoto, et al., "Polymer electrolytes based on polycarbonates and their electrochemical and thermal properties" Ionics, vol. 19, 2013, pp. 615-622.
L.M. Moshurchak, et al., "High-Potential Redox Shuttle for Use in Lithium-Ion Batteries", Journal of the Electrochemical Society, vol. 156, No. 4, 2009, pp. A309-A312.
Q. Li et al., "Composite Cathode for Low-Temperature All-Solid Polymer Lithium Cells" Electrochemical and Solid-State Letters, vol. 7, No. 12, 2004, pp. A470-A473.
B. Proksa, "Capillary zone electrophoretic separation of (R,S)-metipranolol and related substances" Pharmazie, vol. 54, 1999, pp. 431-434.
J. Morgado, et al., "Light-emitting devices based on a poly(p-phenylene vinylene) derivative with ion-coordinating side groups" Journal of Applied Physics, vol. 86, No. 11, 1999, pp. 6392-6395.
Zhaoyin Wen, et al., "Characterization of composite electrolytes based on a hyperbranched polymer" Journal of Power Sources, vol. 90, 2000, pp. 20-26.
Tobias Janoschka, et al., "Storage devices—radically organic", Polymere, Nachrichten aus der Chemie, vol. 60, 2012, pp. 728-731 (with English language translation).
Patricia S. Bey et al., "Effect of a Novel Catechol Copolymer on Cuticle Sclerotization by the American Cockroach", Journal of Bioactive and Compatible Polymers, Oct. 1987, vol. 2, XP008178878, pp. 312-324.
Yuta Saito et al., "Synthesis of poly(dihydroxystyrene-block-styrene)(PDHSt-b-PSt) by the RAFT process and preparation of organic-solvent-dispersive Ag NPs by automatic reduction of metal ions in the presence of PDHSt-b-PSt", Chemical Communications, 2015, vol. 51, XP002753885, 5 pages.
International Search Report dated Sep. 15, 2016 in PCT/EP2016/068862 filed Aug. 8, 2016.
Peter Nesvadba et al., "Synthesis of a polymeric 2,5-di-t-butyl-1,4-dialkoxybenzene and its evaluation as a novel cathode material", Synthetic Metals, Nov. 18, 2010, vol. 161, No. 3, pp. 259-262, XP028151505.
Wei Weng et al., "Smart Polymeric Cathode Material with Intrinsic Overcharge Protection Based on a 2,5-Di-tert-butyl-1,4-dimethoxybenzene Core Structure", Advanced Functional Materials, Nov. 7, 2012, vol. 22, No. 21, pp. 4485-4492, XP001581908.
J. V. Crivello, et al., "Synthesis and Photopolymerization of Monomers Bearing Isopropenylphenoxy Groups", Journal of Polymer Science: Part A: Polymer Chemistry, vol. 33, 1995, pp. 653-663.
Hiroyoshi Kamogawa, et al., "Syntheses of Polymerizable Hydroquinone Derivatives", Journal of Polymer Science: Polymer Chemistry Edition, vol. 14, 1976, pp. 1235-1240.

\* cited by examiner

USE OF CERTAIN POLYMERS AS A CHARGE STORE

The present invention relates to polymers and to the use thereof in the form of active electrode material or in an electrode slurry as electrical charge storage means, the electrical charge storage means especially being secondary batteries. The secondary batteries are especially notable for high cell voltages, a small drop in capacity even after undergoing several charging and discharging cycles, high power densities and simple and scalable processing and production methods (for example by means of screen printing).

BACKGROUND OF THE INVENTION

Organic batteries are electrochemical cells which use an organic charge storage material as active electrode material for storing electrical charge. These secondary batteries are notable for their exceptional properties, such as fast chargeability, long lifetime, low weight, high flexibility and ease of processibility. Active electrode materials which have been described for charge storage in the prior art are various polymeric structures, for example polymeric compounds having organic nitroxide radicals as active units (for example in WO 2012133202 A1, WO 2012133204 A1, WO 2012120929 A1, WO 2012153866 A1, WO 2012153865 A1, JP 2012-221574 A, JP 2012-221575 A, JP 2012-219109 A, JP 2012-079639 A, WO 2012029556 A1, WO 2012153865 A1, JP 2011-252106 A, JP 2011-074317 A, JP 2011-165433 A, WO 2011034117 A1, WO 2010140512 A1, WO 2010104002 A1, JP 2010-238403 A, JP 2010-163551 A, JP 2010-114042 A, WO 2010002002 A1, WO 2009038125 A1, JP 2009-298873 A, WO 2004077593 A1, WO 2009145225 A1, JP 2009-238612 A, JP 2009-230951 A, JP 2009-205918 A, JP 2008-234909 A, JP 2008-218326 A, WO 2008099557 A1, WO 2007141913 A1, US 20020041995 A1, EP 1128453 A2; A. Vlad, J. Rolland, G. Hauffman, B. Ernould, J.-F. Gohy, ChemSusChem 2015, 8, 1692-1696) or polymeric compounds having organic phenoxyl radicals or galvinoxyl radicals as active units (for example US 2002/0041995 A1, JP 2002-117852 A).

Other known active units for charge storage are polymeric compounds having quinones (for example JP 2009-217992 A, WO 2013/099567 A1, WO 2011/068217 A1), having diones (for example JP 2010-212152 A), and having dicyanodiimines (for example JP 2012-190545 A, JP 2010-55923 A).

Polymers including dialkoxybenzene have also been described in the prior art for a multitude of different applications. These include the use thereof as epoxy resins for seething of semiconductor modules (for example described in JP 2013098217 A, JP 2012224758 A, JP 2011231153 A, JP 2011138037 A, JP 2010282154 A, JP 2010266556 A, JP 2010077303 A, JP 2008296436 A or WO 2004098745 A1). In addition, dialkoxybenzene-containing non-polymeric compounds have been used as "redox shuttle" additives for Li ion batteries, in order to prevent overcharging of the Li ion battery (WO 2011/149970 A2). In addition, the use of particular polymers based on dialkoxybenzenes as electrical charge storage means has also been described (P. Nesvadba, L. B. Folger, P. Maire, P. Novak, *Synth. Met.* 2011, 161, 259-262, abbreviated hereinafter to "Nesvadba et al."; W. Weng, Z. C. Zhang, A. Abouimrane, P. C. Redfern, L. A. Curtiss, K. Amine, *Adv. Funct. Mater.* 2012, 22, 4485-4492, abbreviated hereinafter to "Weng et al."). However, these polymers described by Nesvadba et al. and Weng et al. have several disadvantages. Although these have a redox potential above that of the frequently used nitroxide radicals and hence enable higher cell voltages when the dialkoxybenzene-containing polymers are used as cathode material, batteries which have been produced with these polymers described in the literature exhibit a drop in capacity on undergoing several charge and discharge cycles. It is thus desirable, and therefore is a problem addressed by the invention, to provide polymers with which an even higher cell voltage and high constant storage capacities can be achieved over several charge/discharge cycles. In addition, synthesis complexity is a further criterion for the usability of organic materials as active electrode materials. A further problem addressed by the present invention was therefore that of providing polymers that can be synthesized in a very simple manner.

DETAILED DESCRIPTION OF THE INVENTION

Surprisingly, polymers which solve the problems mentioned in the present document have been found. The present invention accordingly relates to a polymer comprising $n^1$ mutually linked repeat units of the chemical structure (I) or $n^2$ mutually linked repeat units of the chemical structure (II) with

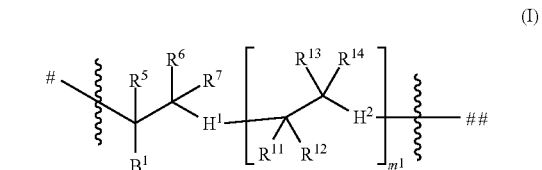
(I)

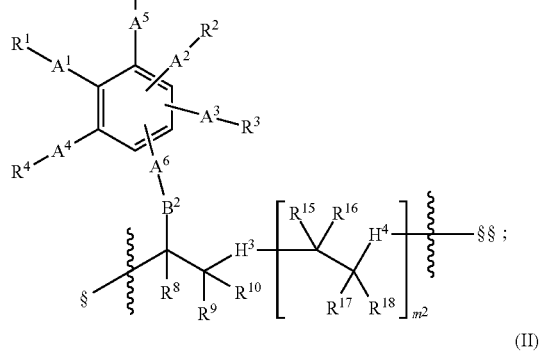

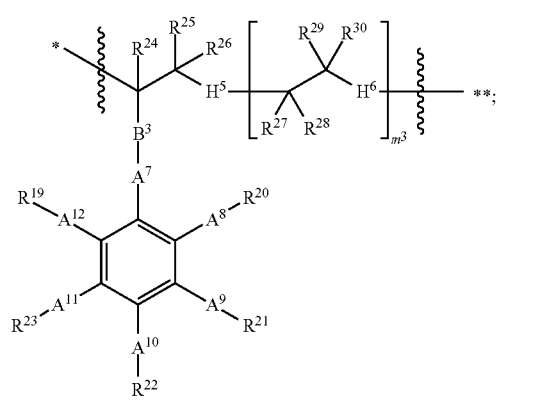
(II)

where $n^1$ and $n^2$ are each independently an integer $\geq 4$,
where $m^1$, $m^2$, $m^3$ are each independently an integer $\geq 0$, where the repeat units of the chemical structure (I) within the polymer are the same or at least partly different from one another, where the repeat units of the chemical structure (II) within the polymer are the same or at least partly different from one another, where the repeat units of the chemical structure (I) within the polymer are joined to one another in such a way that the bond identified by "# #" in a particular repeat unit is joined by the bond identified by "#" in the adjacent repeat unit and the bond identified by "§ § " in a particular repeat unit is joined by the bond identified by "§ " in the adjacent repeat unit, where the repeat units of the chemical structure (II) within the polymer are joined to one another in such a way that the bond identified by "*" in a particular repeat unit is joined by the bond identified by "**" in the adjacent repeat unit, where $H^1$, $H^2$, $H^3$, $H^4$, $H^5$, $H^6$ are independently selected from O, S, NR', where the R', $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ radicals are each independently selected from the group consisting of hydrogen, (hetero) aromatic radical, aliphatic radical optionally substituted by at least one group selected from nitro group, —$NH_2$, —CN, —SH, —OH, halogen and optionally having at least one group selected from ether, thioether, amino ether, carbonyl group, carboxylic ester group, carboxamide group, sulphonic ester group, phosphoric ester, where at least two of $A^1$, $A^2$, $A^3$, $A^4$, $A^5$, $A^6$ are each an oxygen or sulphur atom and the others of $A^1$, $A^2$, $A^3$, $A^4$, $A^5$, $A^6$ are each a direct bond, where at least two of $A^7$, $A^8$, $A^9$, $A^{10}$, $A^{11}$, $A^{12}$ are each an oxygen or sulphur atom and the others of $A^7$, $A^8$, $A^9$, $A^{10}$, $A^{11}$, $A^{12}$ are each a direct bond, and where at least two radicals in ortho positions to one another among the $R^1$, $R^2$, $R^3$, $R^4$ radicals and/or at least two radicals in ortho positions to one another among the $R^{19}$, $R^{20}$, $R^{21}$, $R^{22}$, $R^{23}$ radicals may each also be bridged by at least one (hetero) aromatic ring or aliphatic ring optionally substituted by at least one group selected from nitro group, —$NH_2$, —CN, —SH, —OH, halogen, alkyl group and optionally having at least one group selected from ether, thioether, amino ether, carbonyl group, carboxylic ester group, carboxamide group, sulphonic ester group, phosphoric ester, and where the $R^1$ radical in the case that $A^1$=direct bond, the $R^2$ radical in the case that $A^2$=direct bond, the $R^3$ radical in the case that $A^3$=direct bond, the $R^4$ radical in the case that $A^4$=direct bond, the $R^{19}$ radical in the case that $A^{12}$=direct bond, the $R^{20}$ radical in the case that $A^8$=direct bond, the $R^{21}$ radical in the case that $A^9$=direct bond, the $R^{22}$ radical in the case that $A^{10}$=direct bond, the $R^{23}$ radical in the case that $A^{11}$=direct bond and the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may each also be selected from the group consisting of nitro group, —CN, —F, —Cl, —Br, —I, —$COOR^{36}$, —C(=O)$NHR^{37}$, —$NR^{38}R^{39}$, where $R^{36}$, $R^{37}$, $R^{38}$, $R^{39}$ are each independently selected from the group consisting of hydrogen, (hetero) aromatic radical, aliphatic radical optionally substituted by at least one group selected from nitro group, —$NH_2$, —CN, —SH, —OH, halogen and optionally having at least one group selected from ether, thioether, amino ether, carbonyl group, carboxylic ester group, carboxamide group, sulphonic ester group, phosphoric ester, and where the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may independently also be a radical of the formula —O—$R^{40}$ where $R^{40}$ is an aliphatic radical optionally substituted by at least one group selected from nitro group, —$NH_2$, —CN, —SH, —OH, halogen and optionally having at least one group selected from ether, thioether, amino ether, carbonyl group, carboxylic ester group, carboxamide group, sulphonic ester group, phosphoric ester, where $B^1$, in the case that $A^5$=O or S, $B^2$ in the case that $A^6$=O or S, $B^3$ in the case that $A^7$=O or S, are each independently selected from the group consisting of direct bond, &-$(X^1)_{p1}$—$[C=X^2]_{p2}$—$(X^3)_{p3}$-$B^5$—$(Y^2)_{q2}$—$[C=Y^1]_{q1}$-&&, &-$(Y^3)_{q3}$—$(C=Y^4)$-&&, and where $B^1$, in the case that $A^5$=direct bond, $B^2$ in the case that $A^6$=direct bond, $B^3$ in the case that $A^7$=direct bond, are independently selected from the group consisting of &-$(X^4)_{p4}$—$[C=X^5]_{p5}$—$(X^6)_{p6}$—$B^6$—$(Y^7)_{q6}$—$[C=Y^6]_{q5}$—$(Y^5)_{q4}$-&&, &-$(Y^{10})_{q9}$—$(C=Y^9)_{q8}$—$(Y^8)_{q7}$-&&, where p1, p2, p3 are each 0 or 1, with the proviso that it is not simultaneously true that p1=p3=1 and p2=0, where p4, p5, p6 are each 0 or 1, with the proviso that it is not simultaneously true that p4=p6=1 and p5=0, where q1, q2 are each 0 or 1, where, when q1=0, then q2=0, where q3=0 or 1, where q4, q5, q6 are each 0 or 1, with the proviso that it is not simultaneously true that q4=q6=1 and q5=0, where q7, q8, q9 are each 0 or 1, with the proviso that it is not simultaneously true that q7=q9=1 and q8=0, and that, when q7=1 and q8=0, then q9=0, where $X^2$, $X^5$, $Y^1$, $Y^4$, $Y^6$, $Y^9$ are independently selected from the group consisting of oxygen, sulphur, where $X^1$, $X^3$, $X^4$, $X^6$, $Y^2$, $Y^3$, $Y^7$, $Y^{10}$ are independently selected from the group consisting of O, S, NH, N-alkyl, where $Y^5$, $Y^8$ is selected from NH, N-alkyl, where $B^5$, $B^6$ are independently selected from the group consisting of divalent (hetero) aromatic radical, divalent aliphatic radical optionally substituted by at least one group selected from nitro group, —$NH_2$, —CN, —SH, —OH, halogen and optionally having at least one group selected from ether, thioether, amino ether, carbonyl group, carboxylic ester group, carboxamide group, sulphonic ester group, phosphoric ester, and where "&&" for $B^1$ denotes the bond pointing toward $A^5$, for $B^2$ the bond pointing toward $A^6$, and for $B^3$ the bond pointing toward $A^7$, and where "&" for $B^1$ denotes the bond pointing toward $R^5$, for $B^2$ the bond pointing toward $R^8$, and for $B^3$ the bond pointing toward $R^{24}$.

The polymer according to the invention as per point 1 may especially comprise $n^1$ mutually linked repeat units of the chemical structure (I) with the above-specified definitions of $R^1$ to $R^{18}$, $A^1$ to $A^6$, $B^1$, $B^2$, $H^1$ to $H^4$, $m^1$, $m^2$.

The polymer according to the invention as per point 1 may alternatively especially comprise $n^2$ mutually linked repeat units of the chemical structure (II) with the above-specified definitions of $R^{19}$ to $R^{30}$, $A^7$ to $A^{12}$, $B^3$, $H^5$, $H^6$, $m^3$.

2. More particularly, the present invention relates to a polymer comprising $n^1$ mutually linked repeat units of the chemical structure (I) or $n^2$ mutually linked repeat units of the chemical structure (II) with

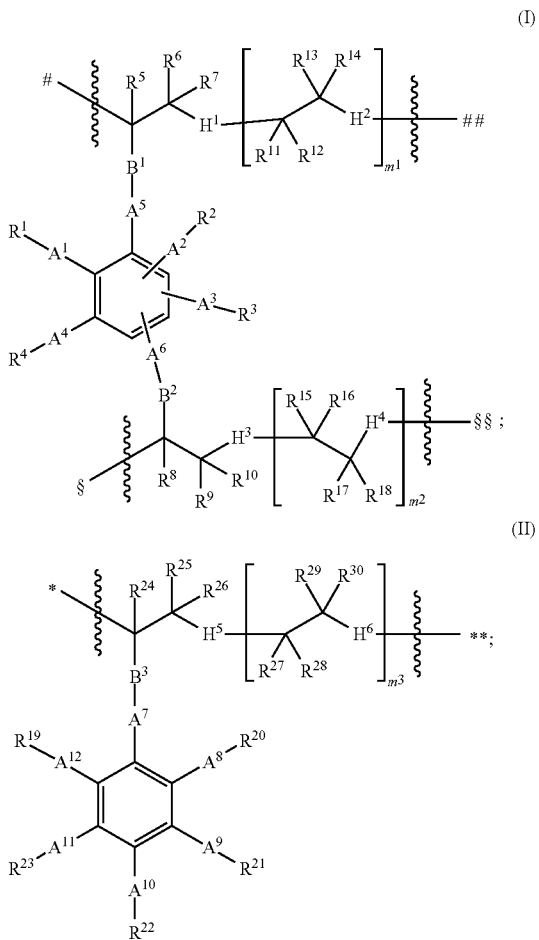

where $n^1$ and $n^2$ are each independently an integer $\geq 4$, especially $\geq 4$ and $\leq 5000$, where $m^1$, $m^2$, $m^3$ are each independently an integer $\geq 0$, especially $\geq 0$ and $\leq 5000$, where the repeat units of the chemical structure (I) within the polymer are the same or at least partly different from one another, where the repeat units of the chemical structure (II) within the polymer are the same or at least partly different from one another, where the repeat units of the chemical structure (I) within the polymer are joined to one another in such a way that the bond identified by "# #" in a particular repeat unit is joined by the bond identified by "#" in the adjacent repeat unit and the bond identified by "§ §" in a particular repeat unit is joined by the bond identified by "§" in the adjacent repeat unit, where the repeat units of the chemical structure (II) within the polymer are joined to one another in such a way that the bond identified by "*" in a particular repeat unit is joined by the bond identified by "**" in the adjacent repeat unit, where $H^1$, $H^2$, $H^3$, $H^4$, $H^5$, $H^6$ are independently selected from O, S, NR', and preferably $H^1=H^2=H^3=H^4=H^5=H^6=$oxygen, where the R', $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ radicals are each independently selected from the group consisting of hydrogen, phenyl, benzyl, aliphatic radical optionally substituted by at least one group selected from nitro group, —$NH_2$, —CN, —SH, —OH, halogen and optionally having at least one group selected from ether, thioether, amino ether, carbonyl group, carboxylic ester group, carboxamide group, sulphonic ester group, phosphoric ester, and especially from the group consisting of hydrogen, alkyl group having 1 to 30 carbon atoms, and where the $R^{11}$, $R^{13}$, $R^{15}$, $R^{17}$ radicals may each independently also be a group of the general structure (III) with

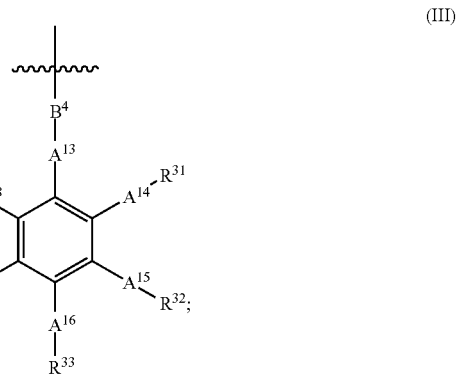

in which the $R^{31}$, $R^{32}$, $R^{33}$, $R^{34}$, $R^{35}$ radicals may independently be as defined for $R^1$ and may especially each independently be an alkyl group having 1 to 30 carbon atoms, where at least two, preferably exactly two, of $A^1$, $A^2$, $A^3$, $A^4$, $A^5$, $A^6$ are each an oxygen or sulphur atom, especially an oxygen atom, and the others of $A^1$, $A^2$, $A^3$, $A^4$, $A^5$, $A^6$ are each a direct bond, where at least two, preferably exactly two, of $A^7$, $A^8$, $A^9$, $A^{10}$, $A^{11}$, $A^{12}$ are each an oxygen or sulphur atom, especially an oxygen atom, and the others of $A^7$, $A^8$, $A^9$, $A^{10}$, $A^{11}$, $A^{12}$ are each a direct bond, where at least two, preferably exactly two, of $A^{13}$, $A^{14}$, $A^{15}$, $A^{16}$, $A^{17}$, $A^{18}$ are each an oxygen or sulphur atom, especially an oxygen atom, and the others of $A^{13}$, $A^{14}$, $A^{15}$, $A^{16}$, $A^{17}$, $A^{18}$ are each a direct bond, and where at least two radicals in ortho positions to one another among the $R^1$, $R^2$, $R^3$, $R^4$ radicals and/or at least two radicals in ortho positions to one another among the $R^{19}$, $R^{20}$, $R^{21}$, $R^{22}$, $R^{23}$ radicals and/or at least two radicals in ortho positions to one another among the $R^{31}$, $R^{32}$, $R^{33}$, $R^{34}$, $R^{35}$ radicals may each also be bridged by at least one (hetero) aromatic ring or aliphatic ring optionally substituted by at least one group selected from nitro group, —$NH_2$, —CN, —SH, —OH, halogen, alkyl group and optionally having at least one group selected from ether, thioether, amino ether, carbonyl group, carboxylic ester group, carboxamide group, sulphonic ester group, phosphoric ester, and where the $R^1$ radical in the case that $A^1$=direct bond, the $R^2$ radical in the case that $A^2$=direct bond, the $R^3$ radical in the case that $A^3$=direct bond, the $R^4$ radical in the case that $A^4$=direct bond, the $R^{19}$ radical in the case that $A^{12}$=direct bond, the $R^{20}$ radical in the case that $A^8$=direct bond, the $R^{21}$ radical in the case that $A^9$=direct bond, the $R^{22}$ radical in the case that $A^{10}$=direct bond, the $R^{23}$ radical in the case that $A^{11}$=direct bond, the $R^{31}$ radical in the case that $A^{14}$=direct bond, the $R^{32}$ radical in the case that $A^{15}$=direct bond, the $R^{33}$ radical in the case that $A^{16}$=direct bond, the $R^{34}$ radical in the case that $A^{17}$=direct bond, the $R^{35}$ radical in the case that $A^{18}$=direct bond and the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may each also be selected from the group consisting of nitro group, —CN, —F, —Cl, —Br, —I, —COOR$^{36}$, —C(=O)NHR$^{37}$, —NR$^{38}$R$^{39}$ where $R^{36}$, $R^{37}$, $R^{38}$, $R^{39}$ are each independently selected from the group consisting of hydrogen, (hetero) aromatic radical, aliphatic radical optionally substituted by at least one group selected from nitro group, —NH$_2$, —CN, —SH, —OH, halogen and optionally having at least one group selected from ether, thioether, amino ether, carbonyl group, carboxylic ester group, carboxamide group, sulphonic ester group, phosphoric ester, and where the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may independently also be a radical of the formula —O—R$^{40}$ where $R^{40}$ is an aliphatic radical optionally substituted by at least one group selected from nitro group, —NH$_2$, —CN, —SH, —OH, halogen and optionally having at least one group selected from ether, thioether, amino ether, carbonyl group, carboxylic ester group, carboxamide group, sulphonic ester group, phosphoric ester, where $B^1$, in the case that $A^5$=O or S, $B^2$ in the case that $A^6$=O or S, $B^3$ in the case that $A^7$=O or S, $B^4$ in the case that $A^{13}$=O or S, are independently selected from the group consisting of direct bond, &-(X$^1$)$_{p1}$—[C=X$^2$]$_{p2}$—(X$^3$)$_{p3}$—B$^5$—(Y$^2$)$_{q2}$—[C=Y$^1$]$_{q1}$-&&, &-(Y$^3$)$_{q3}$—(C=Y$^4$)-&&, and where $B^1$, in the case that $A^5$=direct bond, $B^2$ in the case that $A^6$=direct bond, $B^3$ in the case that $A^7$=direct bond, $B^4$ in the case that $A^{13}$=direct bond, are independently selected from the group consisting of &-(X$^4$)$_{p4}$—[C=X$^5$]$_{p5}$—(X$^6$)$_{p6}$—B$^6$—(Y$^7$)$_{q6}$—[C=Y$^6$]$_{q5}$—(Y$^5$)$_{q4}$-&&, &-(Y$^{10}$)$_{q9}$—(C=Y$^9$)$_{q8}$—(Y$^8$)$_{q7}$-&&, where p1, p2, p3 are each 0 or 1, with the proviso that it is not simultaneously true that p1=p3=1 and p2=0, where p4, p5, p6 are each 0 or 1, with the proviso that it is not simultaneously true that p4=p6=1 and p5=0, where q1, q2 are each 0 or 1, where, when q1=0, then q2=0, where q3=0 or 1, where q4, q5, q6 are each 0 or 1, with the proviso that it is not simultaneously true that q4=q6=1 and q5=0, where q7, q8, q9 are each 0 or 1, with the proviso that it is not simultaneously true that q7=q9=1 and q8=0, and that, when q7=1 and q8=0, then q9=0, where $X^2$, $X^5$, $Y^1$, $Y^4$, $Y^6$, $Y^9$ are independently selected from the group consisting of oxygen, sulphur, where $X^1$, $X^3$, $X^4$, $X^6$, $Y^2$, $Y^3$, $Y^7$, $Y^{10}$ are independently selected from the group consisting of O, S, NH, N-alkyl, where the alkyl group especially has 1 to 10 carbon atoms, where $Y^5$, $Y^8$ is selected from NH, N-alkyl, where the alkyl group especially has 1 to 10 carbon atoms, where $B^5$, $B^6$ are independently selected from the group consisting of divalent (hetero) aromatic radical, divalent aliphatic radical optionally substituted by at least one group selected from nitro group, —NH$_2$, —CN, —SH, —OH, halogen and optionally having at least one group selected from ether, thioether, amino ether, carbonyl group, carboxylic ester group, carboxamide group, sulphonic ester group, phosphoric ester, and especially $B^5$, $B^6$ are each independently a divalent aliphatic radical optionally having at least one group selected from ether, thioether, amino ether, and where "&&" for $B^1$ denotes the bond pointing toward $A^5$, for $B^2$ the bond pointing toward $A^6$, for $B^3$ the bond pointing toward $A^7$, and for $B^4$ the bond pointing toward $A^{13}$, and where "&" for $B^1$ denotes the bond pointing toward $R^5$, for $B^2$ the bond pointing toward $R^8$, for $B^3$ the bond pointing toward $R^{24}$, and for $B^4$ the bond pointing toward $R^{12}$ or $R^{14}$ or $R^{16}$ or $R^{18}$.

The polymer according to the invention as per point 2 may especially comprise $n^1$ mutually linked repeat units of the chemical structure (I) with the above-specified definitions of $R^1$ to $R^{18}$, $A^1$ to $A^6$, $B^1$, $B^2$, $H^1$ to $H^4$, $m^1$, $m^2$.

The polymer according to the invention as per point 2 may alternatively especially comprise $n^2$ mutually linked repeat units of the chemical structure (II) with the above-specified definitions of $R^{19}$ to $R^{30}$, $A^7$ to $A^{12}$, $B^3$, $H^5$, $H^6$, $m^3$.

3. In a preferred embodiment, the present invention relates to a polymer comprising $n^1$ mutually linked repeat units of the chemical structure (I) or $n^2$ mutually linked repeat units of the chemical structure (II) with

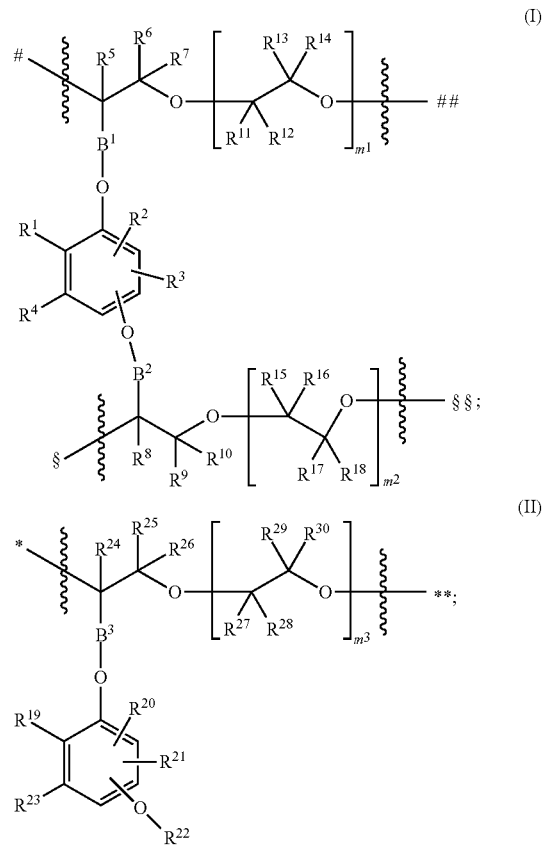

where $n^1$ and $n^2$ are each independently an integer ≥4 and ≤5000, especially ≥10 and ≤1000, where $m^1$, $m^2$, $m^3$ are each independently an integer ≥0 and ≤5000, especially ≥0 and ≤1000, where the repeat units of the chemical structure (I) within the polymer are the same or at least partly different from one another, where the repeat units of the chemical structure (II) within the polymer are the same or at least partly different from one another, where the repeat units of the chemical structure (I) within the polymer are joined to one another in such a way that the bond identified by "# #" in a particular repeat unit is joined by the bond identified by "#" in the adjacent repeat unit and the bond identified by "§ §" in a particular repeat unit is joined by the bond identified by "§" in the adjacent repeat unit, where the repeat units of the chemical structure (II) within the polymer are joined to one another in such a way that the bond identified by "*" in a particular repeat unit is joined by the bond identified by "**" in the adjacent repeat unit, where the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{23}$, $R^{24}$, $R^{25}$, $R^{26}$, $R^{27}$, $R^{28}$, $R^{29}$, $R^{30}$ radicals are each independently selected from the group consisting of hydrogen, alkyl group having 1 to 30 and especially 1 to 8 carbon atoms, and where $R^{22}$ is an alkyl group having 1 to 30 and especially 1 to 8 carbon atoms, and where the $R^{11}$, $R^{13}$, $R^{15}$, $R^{17}$ radicals may each independently also be a group of the general structure (III) with

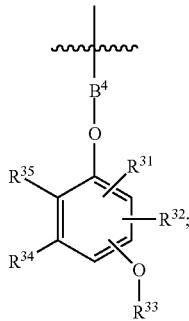

(III)

where the $R^{31}$, $R^{32}$, $R^{34}$, $R^{35}$ radicals are each independently selected from the group consisting of hydrogen, alkyl group having 1 to 30 and especially 1 to 8 carbon atoms, and where $R^{33}$ is an alkyl group having 1 to 30 and especially 1 to 8 carbon atoms, and where $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ may each also be selected from the group consisting of nitro group, —CN, —F, —Cl, —Br, —I, —O—$R^{40}$ where $R^{40}$ is an alkyl group having 1 to 30 and especially 1 to 8 carbon atoms, where $B^1$, $B^2$, $B^3$, $B^4$ are independently selected from the group consisting of direct bond, &-$(X^1)_{p1}$—[C=$X^2$]$_{p2}$—$(X^3)_{p3}$—$B^5$—$(Y^2)_{q2}$—[C=$Y^1$]$_{q1}$-&&, &-$(Y^3)_{q3}$—(C=$Y^4$)-&&, especially from the group consisting of direct bond, &-$(O)_{p1}$—[C=O]$_{p2}$—$(O)_{p3}$—$B^5$-&&, where p1, p2, p3 are each 0 or 1 with the proviso that it is not simultaneously true that p1=p3=1 and p2=0, where q1, q2 are each 0 or 1, where, when q1=0, then q2=0, where q3=0 or 1, where $X^2$, $Y^1$, $Y^4$ are independently selected from the group consisting of oxygen, sulphur, and especially $X^2$=$Y^1$=$Y^4$=O, where $X^1$, $X^3$, $Y^2$, $Y^3$ are independently selected from the group consisting of O, S and especially $X^1$=$X^3$=$Y^2$=$Y^3$=O, and where $B^5$ is selected from the group consisting of &-phenylene-CH$_2$-&&, a divalent aliphatic radical optionally having at least one group selected from ether, thioether, amino ether, especially an alkylene group even more preferably having 1 to 30 carbon atoms, and where "&&" for $B^1$ denotes the bond pointing toward $A^5$=oxygen, for $B^2$ the bond pointing toward $A^6$=oxygen, for $B^3$ the bond pointing toward $A^7$=oxygen, and for $B^4$ the bond pointing toward $A^{13}$=oxygen, and where "&" for $B^1$ denotes the bond pointing toward $R^5$, for $B^2$ the bond pointing toward $R^8$, for $B^3$ the bond pointing toward $R^{24}$, and for $B^4$ the bond pointing toward $R^{12}$ or $R^{14}$ or $R^{16}$ or $R^{18}$.

The polymer according to the invention as per point 3 may especially comprise $n^1$ mutually linked repeat units of the chemical structure (I) with the above-specified definitions of $R^1$ to $R^{18}$, $B^1$, $B^2$, $m^1$, $m^2$.

The polymer according to the invention as per point 1 may alternatively especially comprise $n^2$ mutually linked repeat units of the chemical structure (II) with the above-specified definitions of $R^{19}$ to $R^{30}$, $B^3$, $m^3$.

4. In a more preferred embodiment, the present invention relates to a polymer comprising $n^1$ mutually linked repeat units of the chemical structure (I) or $n^2$ mutually linked repeat units of the chemical structure (II) with

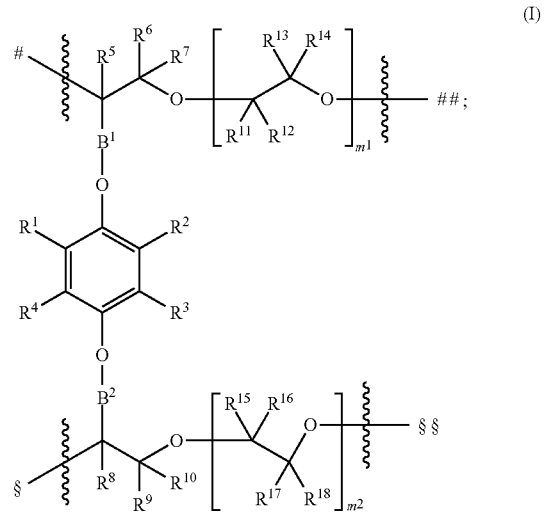

-continued

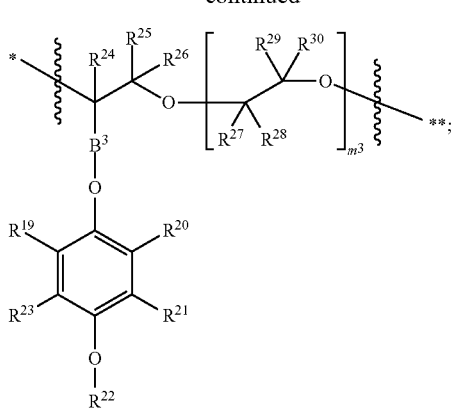
(II)

where $n^1$ and $n^2$ are each independently an integer $\geq 10$ and $\leq 1000$, where $m^1$, $m^2$, $m^3$ are each independently an integer $\geq 0$ and $\leq 1000$, where the repeat units of the chemical structure (I) within the polymer are the same or at least partly different from one another, where the repeat units of the chemical structure (II) within the polymer are the same or at least partly different from one another, where the repeat units of the chemical structure (I) within the polymer are joined to one another in such a way that the bond identified by "# #" in a particular repeat unit is joined by the bond identified by "#" in the adjacent repeat unit and the bond identified by "§ §" in a particular repeat unit is joined by the bond identified by "§" in the adjacent repeat unit, where the repeat units of the chemical structure (II) within the polymer are joined to one another in such a way that the bond identified by "*" in a particular repeat unit is joined by the bond identified by "**" in the adjacent repeat unit, where the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{23}$, $R^{24}$, $R^{25}$, $R^{26}$, $R^{27}$, $R^{28}$, $R^{29}$, $R^{30}$ radicals are each independently selected from the group consisting of hydrogen, alkyl group having 1 to 8 carbon atoms, and where $R^{22}$ is an alkyl group having 1 to 8 carbon atoms, and where the $R^{11}$, $R^{13}$, $R^{15}$, $R^{17}$ radicals may each independently also be a group of the general structure (III) with (III)

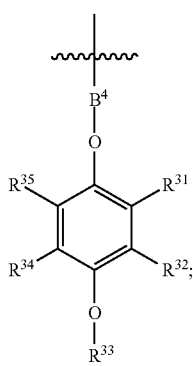

where the $R^{31}$, $R^{32}$, $R^{34}$, $R^{35}$ radicals are each independently selected from the group consisting of hydrogen, alkyl group having 1 to 8 carbon atoms, and where $R^{33}$ is an alkyl group having 1 to 8 carbon atoms, and where $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ may each also be selected from the group consisting of nitro group, —CN, —F, —Cl, —Br, —I, —O—$R^{40}$ where $R^{40}$ is an alkyl group having 1 to 8 carbon atoms, where $B^1$, $B^2$, $B^3$, $B^4$ are independently selected from the group consisting of direct bond, &-$(O)_{p1}$—$[C\!=\!O]_{p2}$—$(O)_{p3}$—$B^5$-&&, where p1, p2, p3 are each 0 or 1, with the proviso that it is not simultaneously true that p1=p3=1 and p2=0, $B^5$ is an alkylene group having 1 to 30 carbon atoms; even more preferably, p1=1, p2=p3=0 and $B^5$ is alkylene radical having 1 to 10 carbon atoms, and where "&&" for $B^1$ denotes the bond pointing toward $A^5$=oxygen, for $B^2$ the bond pointing toward $A^6$=oxygen, for $B^3$ the bond pointing toward $A^7$=oxygen, and for $B^4$ the bond pointing toward $A^{13}$=oxygen, and where "&" for $B^1$ denotes the bond pointing toward $R^5$, for $B^2$ the bond pointing toward $R^8$, for $B^3$ the bond pointing toward $R^{24}$, and for $B^4$ the bond pointing toward $R^{12}$ or $R^{14}$ or $R^{16}$ or $R^{18}$.

The polymer according to the invention as per point 4 may especially comprise $n^1$ mutually linked repeat units of the chemical structure (I) with the definitions of $R^1$ to $R^{18}$, $B^1$, $B^2$, $B^4$, $m^1$, $m^2$ that are specified for the more preferred embodiment.

The polymer according to the invention as per point 4 may alternatively especially comprise $n^2$ mutually linked repeat units of the chemical structure (II) with the definitions of $R^{19}$ to $R^{30}$, $B^3$, $m^3$ that are specified for the more preferred embodiment.

Even more preferably, in the polymer according to the invention as per point 4, $R^1$=$R^3$, $R^2$=$R^4$, $R^{19}$=$R^{21}$, $R^{20}$=$R^{23}$, $R^{31}$=$R^{34}$, $R^{32}$=$R^{35}$, and especially additionally $B^1$, $B^2$, $B^3$, $B^4$ are each independently selected from the group consisting of direct bond, methylene, ethylene, n-propylene, where "&&" and "&" are as defined above. Even more preferably, in that case, $R^5$ to $R^{18}$ and $R^{24}$ to $R^{30}$ are independently alkyl having 1 to 6 carbon atoms or H, and $R^5$ to $R^{18}$ and $R^{24}$ to $R^{30}$ are preferably each H.

Even more preferably $R^1$=$R^3$=H, $R^2$=$R^4$=alkyl group having 1 to 8 and especially 1 to 6 carbon atoms, $R^{19}$=$R^{21}$=H, $R^{20}$=$R^{23}$=alkyl group having 1 to 8 and especially 1 to 6 carbon atoms, $R^{31}$=$R^{34}$=H, $R^{32}$=$R^{35}$=alkyl group having 1 to 8 and especially 1 to 6 carbon atoms, and $B^1$, $B^2$, $B^3$, $B^4$ are each independently selected from the group consisting of direct bond, methylene, ethylene, n-propylene, and in that case, in particular, $B^1$=$B^2$=$B^3$=$B^4$=methylene (where "&&" and "&" are as defined above).

At the same time, in addition, $R^5$ to $R^{18}$ and $R^{24}$ to $R^{30}$ are especially independently alkyl having 1 to 6 carbon atoms or H, and $R^5$ to $R^{18}$ and $R^{24}$ to $R^{30}$ are preferably each H.

Most preferably, the polymer according to the invention is one of the chemical structure (I) as per point 4 where $R^1$=$R^3$=H, $R^2$=$R^4$=tert-butyl, $B^1$=$B^2$=methylene, $R^5$ to $R^{18}$ are each H.

The polymers according to the invention, in contrast to those described by Nesvadba et al. and Weng et al., have a polyethylene glycol-like backbone, which is reflected by the $H^1$ and $H^6$ radicals in the structures (I) and (II). It has been found that, surprisingly, the polymers according to the invention are suitable for use in batteries having a higher discharge voltage, a higher capacity and particularly a surprisingly high constancy in the capacity of the corresponding battery, even after undergoing several charge/discharge cycles.

The polymer according to the invention comprises $n^1$ mutually linked repeat units of the chemical structure (I) or $n^2$ mutually linked repeat units of the chemical structure (II).

In this polymer, $n^1$ and $n^2$ are each independently an integer ≥4, especially an integer ≥4 and ≤5000, preferably an integer ≥10 and ≤1000.

$m^1$, $m^2$, $m^3$ are independently an integer ≥0, especially ≥0 and ≤5000, preferably ≥0 and ≤1000.

In this polymer, the average molar mass (determined by means of size exclusion chromatography with polystyrene standard; DIN 55672-2:2015-02) is especially 700 to 2,000,000 g/mol, preferably 1000 to 1,000,000 g/mol, more preferably 3000 to 300,000 g/mol.

The repeat units of the chemical structure (I) within the polymer are the same or at least partly different from one another. The repeat units of the chemical structure (II) within the polymer are the same or at least partly different from one another.

"At least partly different from one another" means that at least two repeat units differ from one another.

This means, especially in the case of the chemical structure (I), that at least two of the $n^1$ mutually joined repeat units differ in at least one of the $A^1$ to $A^6$, $R^1$ to $R^{18}$, $B^1$, $B^2$ radicals and/or in the value of $m^1$, $m^2$ and/or in the position of $A^2$, $A^3$, $A^6$ on the central phenyl ring.

This means, especially in the case of the chemical structure (II), that at least two of the $n^2$ mutually joined repeat units differ in at least one of the $A^7$ to $A^{12}$, $R^{19}$ to $R^{30}$, $B^3$ radicals and/or in the value of $m^3$.

At the same time, the repeat units of the chemical structure (I) within the polymer are joined to one another in such a way that the bond identified by "# #" in a particular repeat unit is joined by the bond identified by "#" in the adjacent repeat unit and the bond identified by "§ § " in a particular repeat unit is joined by the bond identified by "§ " in the adjacent repeat unit.

At the same time, the repeat units of the chemical structure (II) within the polymer are joined to one another in such a way that the bond identified by "*" in a particular repeat unit is joined by the bond identified by "**" in the adjacent repeat unit.

The end groups of the first repeat unit of the polymer according to the invention which is present for these in the chemical structure (I) at the bonds defined by "#" and "§ ", and the end groups of the $n^1$th repeat unit of the polymer according to the invention which is present for these in the chemical structure (I) at the bonds defined by "#" and "# #", are not particularly restricted and are a result of the polymerization method used in the method for preparing the polymer according to the invention. Thus, they may be termination fragments of an initiator or a repeat unit. Preferably, these end groups are selected from hydrogen, halogen, hydroxyl, unsubstituted aliphatic radical or aliphatic radical substituted by —CN, —OH, halogen (which may especially be an unsubstituted or correspondingly substituted alkyl group), (hetero) aromatic radical, which is preferably a phenyl radical, benzyl radical or α-hydroxybenzyl.

The end groups of the first repeat unit of the polymer according to the invention which is present for these in the chemical structure (II) at the bond defined by "*", and the end groups of the $n^2$th repeat unit of the polymer according to the invention which is present for these in the chemical structure (II) at the bond defined by "**", are not particularly restricted and are a result of the polymerization method used in the method for preparing the polymer according to the invention. Thus, they may be termination fragments of an initiator or a repeat unit. Preferably, these end groups are selected from hydrogen, halogen, hydroxyl, unsubstituted aliphatic radical or aliphatic radical substituted by —CN, —OH, halogen (which may especially be an unsubstituted or correspondingly substituted alkyl group), (hetero) aromatic radical, which is preferably a phenyl radical, benzyl radical or α-hydroxybenzyl.

In the case of $B^1$, "&&" denotes the bond pointing toward $A^5$. This is the chemical bond that joins $B^1$ to $A^5$. In the case of $B^1$, "&" denotes the bond pointing toward $R^5$. This is the other chemical bond in the chemical structure (I) that leads away from $B^1$, i.e. the chemical bond that joins $B^1$ to the carbon atom with pendant $R^5$.

In the case of $B^2$, "&&" denotes the bond pointing toward $A^6$. This is the chemical bond that joins $B^2$ to $A^6$. In the case of $B^2$, "&" denotes the bond pointing toward $R^8$. This is the other chemical bond in the chemical structure (I) that leads away from $B^2$, i.e. the chemical bond that joins $B^2$ to the carbon atom with pendant $R^8$.

In the case of $B^3$, "&&" denotes the bond pointing toward $A^7$. This is the chemical bond that joins $B^3$ to $A^7$. In the case of $B^3$, "&" denotes the bond pointing toward $R^{24}$. This is the other chemical bond in the chemical structure (II) that leads away from $B^3$, i.e. the chemical bond that joins $B^3$ to the carbon atom with pendant $R^{24}$.

In the case of $B^4$, "&&" denotes the bond pointing toward $A^{13}$. This is the chemical bond that joins $B^4$ to $A^{13}$. In the case of $B^4$, "&" denotes the bond pointing toward $R^{12}$ or $R^{14}$ or $R^{16}$ or $R^{18}$. This is the other chemical bond in the chemical structure (III) that leads away from $B^4$, i.e. the chemical bond that, when the chemical structure (III) is $R^{11}$, joins $B^4$ to the carbon atom with pendant $R^{12}$, or that, when the chemical structure (III) is $R^{13}$, joins $B^4$ to the carbon atom with pendant $R^{14}$, or that, when the chemical structure (III) is $R^{15}$, joins $B^4$ to the carbon atom with pendant $R^{16}$, or that, when the chemical structure (III) is $R^{17}$, joins $B^4$ to the carbon atom with pendant $R^{18}$.

An aliphatic radical in the context of the invention is an acyclic or cyclic, saturated or unsaturated, unbranched or branched hydrocarbyl group which is nonaromatic.

An aliphatic radical may be monovalent, i.e. joined to the rest of the molecule only via one of its carbon atoms. A monovalent hydrocarbyl radical is especially a hydrocarbyl group selected from alkyl group, alkenyl group, alkynyl group and saturated or unsaturated cycloalkyl group. In the presence of a double bond an unsaturated cycloalkyl group is called "cycloalkenyl group", and in the presence of a triple bond a "cycloalkynyl group".

An aliphatic radical may alternatively be divalent, i.e. joined to the rest of the molecule via two of its carbon atoms. A divalent hydrocarbyl radical is especially a hydrocarbyl group selected from alkylene group, alkenylene group, alkynylene group, and saturated or unsaturated cycloalkylene group. In the presence of a double bond an unsaturated cycloalkylene group is called "cycloalkenylene group", and in the presence of a triple bond a "cycloalkenylene group". When they are not referred to explicitly as divalent in this invention, the term "aliphatic radical" in the context of this invention shall be understood to mean monovalent aliphatic radicals.

In the context of the invention, an "alkyl group" is unbranched or branched and is a monovalent saturated hydrocarbyl radical having the general chemical structure (a) with

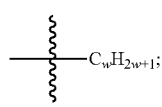
(a)

The chain of carbon atoms "—$C_wH_{2w+1}$" may be linear, in which case the group is an unbranched alkyl group. Alternatively, it may have branches, in which case it is a branched alkyl group.

In this case, w in the chemical structure (a) is, an integer, especially from the range of 1 to 30, preferably from the range of 1 to 18, more preferably from the range of 1 to 12, even more preferably from the range of 1 to 10, even more preferably still from the range of 1 to 8, most preferably from a range of 1 to 6. w in an unbranched or branched alkyl group having 1 to 30 carbon atoms is selected from the range of 1 to 30. w in an unbranched or branched alkyl group having 1 to 18 carbon atoms is selected from the range of 1 to 18. w in an unbranched or branched alkyl group having 1 to 12 carbon atoms is selected from the range of 1 to 12. w in an unbranched or branched alkyl group having 1 to 10 carbon atoms is selected from the range of 1 to 10. w in an unbranched or branched alkyl group having 1 to 8 carbon atoms is selected from the range of 1 to 8. w in an unbranched or branched alkyl group having 1 to 6 carbon atoms is selected from the range of 1 to 6.

In the context of the invention, an "unbranched or branched alkyl group having 1 to 30 carbon atoms" is especially selected from methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, n-pentacosyl, n-hexacosyl, n-heptacosyl, n-octacosyl, n-nonacosyl, n-triacontyl.

In the context of the invention, an "unbranched or branched alkyl group having 1 to 18 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-undecyl, n-dodecyl, n-tridecyl, n-tetradecyl, n-pentadecyl, n-hexadecyl, n-heptadecyl, n-octadecyl.

In the context of the invention, an "unbranched or branched alkyl group having 1 to 12 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-undecyl, n-dodecyl.

In the context of the invention, an "unbranched or branched alkyl group having 1 to 10 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl.

In the context of the invention, an "unbranched or branched alkyl group having 1 to 8 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl.

In the context of the invention, an "unbranched or branched alkyl group having 1 to 6 carbon atoms" is especially selected from the, group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl.

According to the invention, an alkyl group having 1 to 30 carbon atoms is especially an alkyl group having 1 to 18, preferably 1 to 12, more preferably 1 to 10, even more preferably 1 to 8 and most preferably 1 to 6 carbon atoms.

According to the invention, an alkyl group having 1 to 6 carbon atoms is especially an alkyl group having 1 to 4 carbon atoms and even more preferably selected from methyl, ethyl, n-propyl iso-propyl, n-butyl, sec-butyl, tert-butyl.

In the context of the invention, an "alkenyl group" is unbranched or branched and is obtained from an alkyl group by replacement of at least one CH—CH single bond in the alkyl group by a C=C double bond.

In the context of the invention, an "alkynyl group" is unbranched or branched and is obtained from an alkyl group by replacement of at least one $CH_2$—$CH_2$ single bond in the alkyl group by a C≡C triple bond or from an alkenyl group by replacement of at least one CH=CH double bond in the alkenyl group by a C≡C triple bond in each case.

A saturated cycloalkyl group is an alkyl radical in which at least 3 carbon atoms are present within a saturated ring, and may additionally also comprise further carbon atoms not present in the ring. It may be joined to the rest of the molecule via one of these ring carbon atoms or via carbon atoms that are not within the ring. In the context of the invention, a cycloalkyl group is especially selected from cyclopropyl, cyclobutyl, cyclopropylmethyl, cyclopentyl, cyclobutylmethyl, cyclohexyl, cycloheptyl, cyclooctyl, cyclononyl, cyclodecyl, cycloundecyl, cyclododecyl, cyclotridecyl, cyclotetradecyl, cyclopentadecyl.

An unsaturated cycloalkyl group is obtained from a saturated cycloalkyl group by replacement of at least one CH—CH single bond in the saturated cycloalkyl group by at least one C=C double bond (to give the cycloalkenyl group) and/or of a CH$_2$—CH$_2$ single bond with a C≡C triple bond (to give the cycloalkynyl group).

An alkylene group in the context of the, invention especially has 1 to 30, preferably 1 to 12 and more preferably 1 to 6 carbon atoms and may be branched or unbranched in the context of the invention. "Alkylene group" in the context of the invention denotes a divalent saturated hydrocarbyl radical which can be described by the general chemical structure (b) with

(b)

The chain of carbon atoms "—C$_x$H$_{2x}$—" may be linear, in which case the group is an unbranched alkylene group. Alternatively, it may have branches, in which case it is a branched alkylene group. x in the chemical, structure (b) is an integer.

x in an unbranched or branched alkylene group having 1 to 30 carbon atoms is selected from the range of 1 to 30.

x in an unbranched or branched alkylene group having 1 to 12 carbon atoms is selected from the range of 1 to 12.

x in an unbranched or branched alkylene group having 1 to 6 carbon atoms is selected from the range of 1 to 6.

According to the invention, an alkylene group especially has 1 to 6 carbon atoms and preferably 1 to 4 carbon atoms and is more preferably selected from methylene, ethylene, n-propylene, n-butylene.

In the context of the invention, an "alkenylene group" is unbranched or branched and is obtained from an alkylene group by replacement of at least one CH—CH single bond in the alkylene group by a C=C double bond.

In the context of the invention, an "alkynylene group" is unbranched or branched and is obtained from an alkyl group by replacement of at least one CH$_2$—CH$_2$ single bond in the alkylene group by a C≡C triple bond or from an alkenylene group by replacement of at least one CH=CH double bond in the alkenylene group by a C≡C triple bond.

In the context of the invention, a saturated cycloalkylene group is a divalent saturated hydrocarbyl group having at least 3 and especially 3 to 30 carbon atoms and having at least one saturated ring composed of 3 to 30 carbon atoms, preferably a chemical structure (c) with

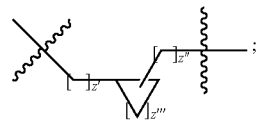

(c)

where z' is especially an integer from 0 to 27; where z" is especially an integer from 0 to 27; where z''' is especially an integer from 1 to 28; and where, at the same time, z'+z"+z'''≤28.

In the context of the invention, an unsaturated cycloalkylene group is obtained from a saturated cycloalkylene group by replacement of at least one CH—CH single bond in the cycloalkylene group by a C=C double bond (to give the cycloalkenylene group) and/or by replacement of at least one CH$_2$—CH$_2$ single bond in the cycloalkylene group by a C≡C triple bond (to give the cycloalkenylene group).

A (hetero) aromatic radical in the context of the invention is a heteroaromatic or aromatic radical. A (hetero) aromatic radical may be monovalent, i.e. may be bonded to the rest of the molecule via just one of its carbon atoms (in the case of an aromatic radical) or via one of its carbon atoms or heteroatoms (in the case of a heteroaromatic radical).

A (hetero) aromatic radical may alternatively be divalent, i.e. may be bonded to the rest of the molecule via two of its carbon atoms (in the case of an aromatic radical) or may be bonded to the rest of the molecule via two of its carbon atoms, two of its heteroatoms or one of its carbon atoms and one of its heteroatoms (in the case of a heteroaromatic radical).

When they are not referred to explicitly as divalent in this invention, the term "(hetero) aromatic radical" in the context of this invention shall be understood to mean monovalent (hetero) aromatic radicals.

An aromatic radical has exclusively carbon atoms and at least one aromatic ring. An aromatic radical is especially selected from aryl radical, aralkyl radical, alkaryl radical. Aryl radicals have exclusively aromatic rings and are joined to the molecule via a carbon atom in the aromatic ring. An aryl radical is preferably phenyl.

Alkaryl radicals have at least one aromatic ring via which they are joined to the rest of the molecule and additionally also bear alkyl radicals on the aromatic ring. An alkaryl radical is preferably tolyl. Aralkyl radicals are formally derived by replacement of a hydrocarbyl radical of an alkyl group with an aryl group or an alkaryl group. An alkaryl radical is preferably benzyl, phenylethyl, α-methylbenzyl.

A heteroaromatic radical is especially selected from heteroaryl radical, heteroaralkyl radical, alkylheteroaryl radical. It is an aromatic radical which additionally has at least one heteroatom, especially a heteroatom selected from the group consisting of nitrogen, oxygen, sulphur, within the aromatic ring or, in the case of a heteroaralkyl radical or an alkylheteroaryl radical, alternatively or additionally outside the aromatic ring.

Preferred (hetero) aromatic radicals selected from the group consisting of a ring of the above identified chemical structure (III), azole, imidazole, pyrrole, pyrazole, triazole, tetrazole, thiophene, furan, thiazole, thiadiazole, oxazole, oxadiazole, pyridine, pyrimidine, triazine, tetrazine, thiazine, benzofuran, purine, indole, 9-anthryl, 9-phenanthryl.

A divalent (hetero) aromatic radical in the context of the invention is a divalent aromatic radical or a divalent heteroaromatic radical.

According to the invention, a divalent aromatic radical is a divalent hydrocarbyl group having at least 6 and preferably 6 to 30 carbon atoms, of which at least 6 carbon atoms are present in an aromatic system and the other carbon atoms, if present, are saturated. The divalent aromatic radical may be joined to the rest of the molecule via carbon atoms in the aromatic system or, if present, saturated carbon atoms.

Preferably, a divalent aromatic radical is a chemical structure (d) with

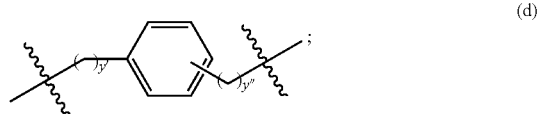

(d)

where y' is an integer >0, preferably from 0 to 24; where y" is an integer >0, preferably from 0 to 24; and where preferably, at the same time, y'+y"≤24.

A divalent heteroaromatic radical is a divalent aromatic radical which additionally has at least one heteroatom, especially at least one heteroatom selected from the group consisting of nitrogen, oxygen, sulphur, within, or outside the aromatic ring, preferably within the aromatic ring, but is especially joined to the rest of the molecule via carbon atoms.

"Aliphatic radical optionally substituted by at least one group selected from nitro group, —$NH_2$, CN, SH, OH, halogen and optionally having at least one group selected from ether, thioether, amino ether, carbonyl group, carboxylic ester group, carboxamide group, sulphonic ester group, phosphoric ester" means that at least one hydrogen atom bonded to a carbon atom in the aliphatic radical may (but need not) be replaced by a group selected from nitro group, —$NH_2$, —CN, —SH, —OH, halogen and/or that, in the aliphatic radical, at least one $CH_2$ group joined to two $sp^3$-hybridized carbon atoms, preferably to two —$CH_2$— groups, more preferably to two —$CH_2CH_2$— groups, may (but need not) be replaced by an oxygen atom (in which case an ether group is present), a sulphur atom (in which case a thioether group is present), an NH or N-alkyl group (in which case an amino ether group is present), a —C(═O)— group (in which case a carbonyl group is present), a —C(═O)—O— group (in which case a carboxylic ester group is present), a —C(═O)—NH— or —C(═O)—N(alkyl)-group (in which case a carboxamide group is present), an —$SO_2$—O— group (in which case a sulphonic ester is present), an —$OPO_2$—O— group (in which case a phosphoric ester is present).

"Divalent aliphatic radical optionally substituted by at least one group selected from nitro group, —$NH_2$, CN, SH, OH, halogen and optionally having at least one group selected from ether, thioether, amino ether, carbonyl group, carboxylic ester group, carboxamide group, sulphonic ester group, phosphoric ester" means that at least one hydrogen atom bonded to a carbon atom in the divalent aliphatic radical may (but need not) be replaced by a group selected from nitro group, —$NH_2$, —CN, —SH, —OH, halogen and/or that, in the aliphatic radical, at least one $CH_2$ group joined to two $sp^3$-hybridized carbon atoms, preferably to two —$CH_2$— groups, more preferably to two —$CH_2CH_2$— groups, may (but need not) be replaced by an oxygen atom (in which case an ether group is present), a sulphur atom (in which case a thioether group is present), an NH or N-alkyl group (in which case an amino ether group is present), a —C(═O)— group (in which case a carbonyl group is present), a —C(═O)—O— group (in which case a carboxylic ester group is present), a —C(═O)—NH— or —C(═O)—N(alkyl)-group (in which case a carboxamide group is present), an —$SO_2$—O— group (in which case a sulphonic ester is present), an —$OPO_2$—O— group (in which case a phosphoric ester is present).

The polymers according to the invention can be prepared in a simple and uncomplicated manner, and from readily obtainable starting materials. Depending on the type of polymerization used, some of the monomers can be prepared from starting materials available commercially at very low cost in just one synthesis stage without chromatographic separation methods, which offers a distinct advance over preparation methods known in the technical literature. No further monomer is needed for polymerization and the polymerization does not require any costly metal catalysts; instead, the preparation methods used may be simple polymerization processes. At the same time, it is possible to obtain polymers having a high molar mass in very high yields. The introduction of polymerizable groups of low molar mass makes it possible to keep the molar mass of the monomer low and to maximize the theoretical capacity (which is inversely proportional to the molar mass) of the secondary electrical charge storage means. In addition, the redox active groups in these polymers are not conjugated to one another; as a consequence, the electrical charge storage means has a flat charging/discharging plateau. These materials differ from the prior art by a very simple synthesis from starting materials available commercially at very low costs in just one synthesis stage in some cases, without chromatographic separation methods. Furthermore, the high redox potential of the polymers according to the invention enables higher cell voltages and energy densities than in the known systems and allows higher discharge voltages.

The polymers according to this invention may either be homopolymers or copolymers. Homopolymers are polymers which have been synthesized only from one monomer. Copolymers are polymers which have been synthesized from two or more monomers. If two or more monomers are used in the synthesis, the monomers of the repeat units of the polymers, according to this invention, may be present in the polymer in random distribution, as blocks or in alternation. The polymers according to this invention may be present either in linear form [as in structure (II)] or in crosslinked form [as in structure (I)].

The polymers of the invention can be synthesized by an anionic or cationic polymerization, as known to those skilled in the art, of a compound of the structure (II)' or (II)' below and optionally also with a compound of the structure (III)' below. In the structures (I)' or (II)' in the scheme below, the $R^{1'}$ to $R^{10'}$ and $R^{19'}$ to $R^{30'}$, $B^{1'}$ to $B^{3'}$, $A^{1'}$ to $A^{12'}$, $H^{1'}$ to $H^{3'}$ radicals are each as defined above for $R^1$ to $R^{10}$ and $R^{19}$ to $R^{30}$, $B^1$ to $B^3$, $A^1$ to $A^{12}$ and $H^1$ to $H^3$. $H^{4'}$ is as defined for $H^1$.

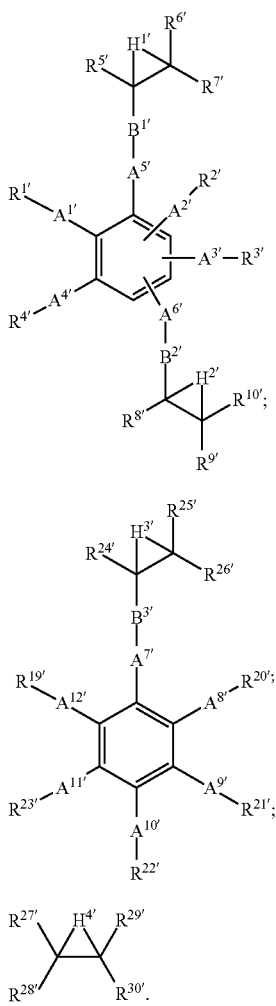

(I)'

(II)'

(III)'

A polymer of the structure (I) can be obtained here by an anionic or cationic polymerization in which exclusively monomers of the structure (I)' are used, such that the polymer of the structure (I) obtained is a homopolymer in which $m^1=m^2=0$.

A polymer of the structure (I) can be obtained here by an anionic or cationic polymerization in which monomers of the structure (I)' and (II)' are used, such that the polymer of the structure (I) obtained is a copolymer in which $m^1$, $m^2 \geq 0$ and the $R^{11}$, $R^{13}$, $R^{15}$ or $R^{17}$ radical in the above structure (I) is in each case independently a group of the aforementioned general structure (III).

A polymer of the structure (I) can be obtained here by an anionic or cationic polymerization in which monomers of the structure (I)' and (III)' are used, such that the polymer of the structure (I) obtained is a copolymer in which $m^1$, $m^2 \geq 0$ and the $R^{11}$, $R^{13}$, $R^{15}$, $R^{17}$ radicals in the above structure (I) cannot be a group of the general structure (III).

A polymer of the structure (I) can be obtained here by an anionic or cationic polymerization in which monomers of the structure (I)', (II)' and (III)' are used, such that the polymer of the structure (I) obtained is a copolymer in which $m^1$, $m^2 \geq 0$ and the $R^{11}$, $R^{13}$, $R^{15}$, $R^{17}$ radicals in the above structure (I) may each independently also be a group of the aforementioned general structure (III).

A polymer of the structure (II) can be obtained here by an anionic or cationic polymerization in which exclusively monomers of the structure (II)' are used, such that the polymer of the structure (II) obtained is a homopolymer in which $m^3=0$.

A polymer of the structure (II) can be obtained here by an anionic or cationic polymerization in which monomers of the structure (II)' and (III)' are used, such that the polymer of the structure (II) obtained is a copolymer in which $m^3 \geq 0$.

The compounds of the structures (I)' and (II)' are available to the person skilled in the art via known methods, for example by reaction of a dihydroxybenzene or di(hydroxymethyl)benzene with epichlorohydrin, as outlined in the scheme below (Synthesis Scheme 1). The examples are shown on the basis of the abovementioned structure (I)' but apply correspondingly to the synthesis of a compound of the abovementioned structure (II)'. $R^A$, $R^B$, $R^C$, $R^D$ correspond to $A^{1'}$-$R^{1'}$, $A^{2'}$-$R^{2'}$, $A^{3'}$-$R^{3'}$, $A^{4'}$-$R^{4'}$ from the structure (I)'.

Synthesis Scheme 1

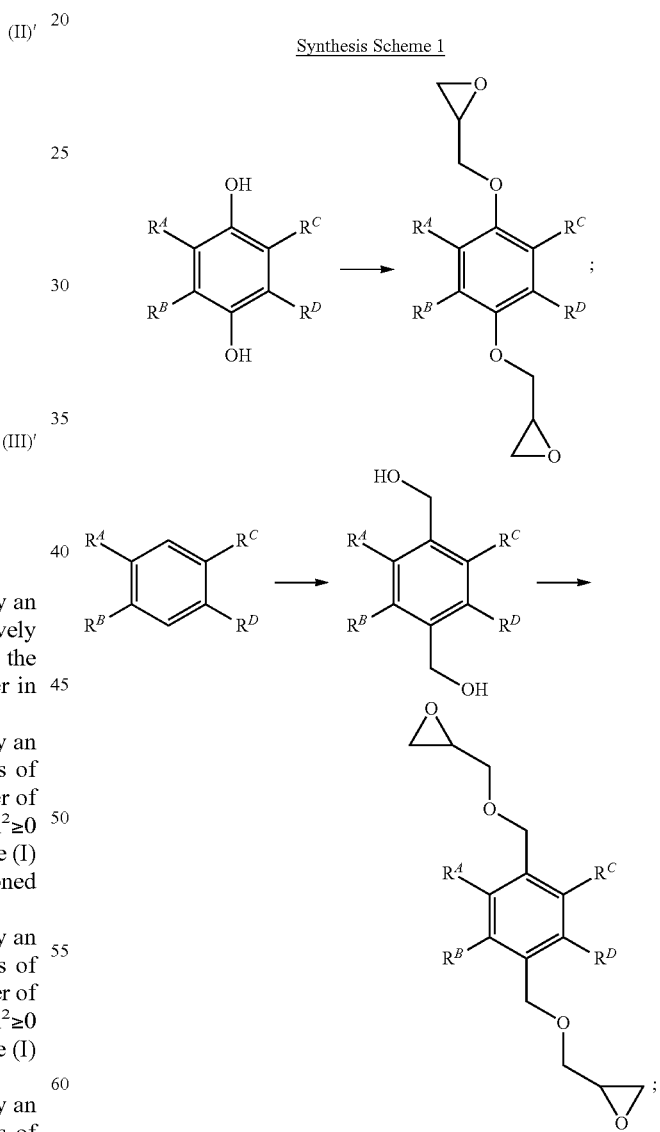

The inventive polymers according to the chemical structures (I) and (II) can be synthesized from the respective monomers (I)', (II)' and (III)' by polymerization methods familiar to the person skilled in the art, such as cationic polymerization (analogously to the known methods for synthesis of polyethylene glycol and derivatives thereof) or anionic polymerization. Preferably, the cationic polymerization is analogous to the known methods for synthesis of polyethylene glycol and derivatives thereof.

The cationic polymerization is preferably conducted within a temperature range from −30 to 150° C., advantageously within a temperature range from 40 to 120° C., in a solvent and in a reaction time of 0.1 to 100 hours, using a catalyst, for example Lewis acids or protic acid, preferably sulphuric acid, nitric acid, perchloric acid, boran trifluoroetherate complex, aluminium trichloride, tin tetrachloride, diethylzinc/water or titanium tetrachloride. There is no restriction in respect of solvents used. Preference is given to organic solvents, for example N,N'-dimethylformamide, N,N'-dimethylacetamide, dimethyl sulphoxide, N-methylpyrrolidone, dichloromethane, tetrahydrofuran, 1,4-dioxolane, 1,2-dichloroethane, toluene, xylene, chlorobenzene, o-dichlorobenzene.

The anionic polymerization is preferably synthesized within a temperature range from −78 to 150° C., advantageously within a temperature range from −50 to 50° C., in a solvent and with a reaction time of 0.1 to 100 hours, using a catalyst, for example Lewis bases or bases, preferably metal amides such as sodium amides, and $Li_2C_2H_5$, alkoxides such as methoxide or ethoxide, hydroxides such as sodium hydroxide or potassium hydroxide, cyanides, phosphines, amines or organometallic compounds, for example n-butyllithium or vinylmagnesium bromide. There are no restrictions in respect of solvents used. Preference is given to organic solvents, for example tetrahydrofuran, 1,4-dioxolane, diethyl ether, tert-butyl methyl ether, toluene, xylene, chlorobenzene or o-dichlorobenzene.

It has been found to be advantageous, for a further improvement in the battery properties such as constancy of capacity, etc., to conduct the anionic or cationic polymerization in the presence of conductivity additives, for example the carbon materials described below (including, for example, "SuperP®" among the carbon blacks), as described in A. Vlad, J. Rolland, G. Hauffman, B. Ernould, J.-F. Gohy, ChemSusChem 2015, 8, 1692-1696 for other polymers.

The polymer according to the invention is especially suitable for use as redox-active electrode material in an electrical charge storage means, preferably for storage of electrical energy, and more preferably as a positive electrode element.

More preferably, the redox-active electrode material takes the form of an at least partial surface coating of electrode elements for electrical charge storage means, especially secondary batteries. Electrode elements comprise at least one surface layer and one substrate.

A redox-active material for storage of electrical energy is a material which can store electrical charge and release it again, for example by accepting and releasing electrons. This material can be used, for example, as an active electrode material in an electrical charge storage means. Such electrical charge storage means for storage of electrical energy are especially selected from the group consisting of secondary batteries (also called "accumulators"), redox flow batteries, supercapacitors, and preferably secondary batteries.

Preferably, the electrical charge storage means is a secondary battery. A secondary battery comprises a negative electrode and a positive electrode which are separated from one another by a separator, and an electrolyte which surrounds the electrodes and the separator.

The, separator is a porous layer which is ion-permeable and enables the balancing of the charge. The task of the separator is to separate the positive electrode from the negative electrode and to enable balancing of charge through permutation of ions. The separator used in the secondary battery is especially a porous material, preferably a membrane consisting of a polymeric compound, for example polyolefin, polyamide or polyester. In addition, it is possible to use separators made from porous ceramic materials.

The main task of the electrolyte is to assure ion conductivity, which is needed to balance the charge. The electrolyte of the secondary battery may be either a liquid or an oligomeric or polymeric compound having high ion conductivity ("get electrolyte" or "solid state electrolyte"). Preference is given, however, to an oligomeric or polymeric compound.

If the electrolyte is liquid, it is especially composed of one or more solvents and one or more conductive salts.

The solvent of the electrolytes preferably independently comprises one or more solvents having a high boiling point and high ion conductivity but low viscosity, for example acetonitrile, dimethyl sulphoxide, ethylene carbonate, propylene carbonate, dimethyl carbonate, diethyl carbonate, methyl ethyl carbonate, γ-butyrolactone, tetrahydrofuran, dioxolane, 1,2-dimethoxymethane, 1,2-dimethoxyethane, diglyme, triglyme, tetraglyme, ethyl acetate, 1,3-dioxolane or water.

The conductive salt in the electrolyte consists of a cation of the formula $M^{e+}$ and an anion of the formula $An^{f-}$ of the formula $(M^{e+})_a(An^{f-})_b$ where e and f are integers depending on the charge of M and An; a and b are integers which represent the molecular composition of the conductive salt.

Cations used in the abovementioned conductive salt are positively charged ions, preferably metals of the first and second main groups, for example lithium, sodium, potassium or magnesium, but also other metals of the transition groups, such as zinc, and organic cations, for example quaternary ammonium compounds such as tetraalkylammonium compounds. The preferred cation is lithium.

Anions used in said conductive salt are preferably inorganic anions such as hexafluorophosphate, tetrafluoroborate, triflate, hexafluoroarsenate, hexafluoroantimonate, tetrafluoroaluminate, tetrafluoroindate, perchlorate, bis(oxalato)borate, tetrachloroaluminate, tetrachlorogallate, but also organic anions, for example $N(CF_3SO_2)_2^-$, $CF_3SO_3^-$, alkoxides, for example tert-butoxide or iso-propoxide, but also halides such as fluoride, chloride, bromide and, iodide. The preferred anion is perchlorate, $ClO_4^-$.

The preferred conductive salt is thus $LiClO_4$.

If ionic liquids are used, they can be used either as solvent of the electrolyte, as conductive salt, or else as complete electrolyte.

In the embodiment in which the redox-active electrode material takes the form of an at least partial surface coating of electrode elements for electrical charge storage means, especially secondary batteries, an electrode element has an at least partial layer on a substrate surface. This, layer especially comprises a composition comprising the polymer according to the invention as redox-active material for charge storage and especially at least also a conductivity additive and especially also at least one binder additive.

The application of this composition (expression for composition: "composite") on the substrate is possible by means of methods known to those skilled in the art. More particularly, the polymer according to the invention is applied on the substrate with the aid of an electrode slurry.

The substrate of the electrode element is especially selected from conductive materials, preferably metals, carbon materials, oxide substances.

Preferred metals are selected from platinum, gold, iron, copper, aluminium or a combination of these metals. Preferred carbon materials are selected from glassy carbon, graphite film, graphene, carbon sheets. Preferred oxide substances are, for example, selected from the group consisting of indium tin oxide (ITO), indium zinc oxide (IZO), antimony zinc oxide (AZO), fluorine tin oxide (FTO) or antimony tin oxide (ATO).

The surface layer of the electrode element comprises at least the polymer according to the invention as redox-active material for charge storage and especially at least a conductivity additive and a binder additive.

The conductivity additive is especially at least one electrically conductive material, preferably selected from the group consisting of carbon materials, electrically conductive polymers, and especially carbon materials. Carbon materials are especially selected from the group consisting of carbon fibres, carbon nanotubes, graphite, carbon black graphene, and are more preferably carbon fibres. Electrically conductive polymers are especially selected from the group consisting of polyanilines, polythiophenes, polyacetylenes, poly(3,4-ethylenedioxythiophene) polystyrenesulphonate (=PEDOT:PSS), polyarcenes.

Binder additives are especially materials having binder properties and are preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

The polymer according to the invention is especially applied to the substrate of the electrode element in an electrode slurry.

The electrode slurry is a solution or suspension and comprises the polymer according to the invention and especially the above-described conductivity additive and the above-described binder additive.

The electrode slurry preferably comprises a solvent and further constituents comprising redox-active material for storage of electrical energy (which is especially the polymer according to the invention), and preferably also the conductivity additive and the binder additive.

In the further constituents, preferably, the proportion of the redox-active material for storage of electrical energy (which is especially the polymer according to the invention) is from 5 to 100 percent by weight, the proportion of the conductivity additive from 0 to 80 and preferably 5 to 80 percent by weight, and the proportion of binder additive 0 to 10 and preferably 1 to 10 percent by weight, where the sum total is 100 percent by weight.

Solvents used for the electrode slurry are independently one or more solvents, preferably solvents having a high boiling point, more preferably selected from the group consisting of N-methyl-2-pyrrolidone, water, dimethyl sulphoxide, ethylene carbonate, propylene carbonate, dimethyl carbonate, methyl ethyl carbonate, γ-butyrolactone, tetrahydrofuran, dioxolane, sulpholane, N,N'-dimethylformamide, N,N'-dimethylacetamide. The concentration of the redox-active material, especially of the polymer according to the invention, for storage of electrical energy in the abovementioned electrode slurry is preferably between 0.1 and 10 mg/ml, more preferably between 0.5 and 5 mg/ml.

If the polymer of this invention as redox-active material is used as positive electrode element for electrical charge storage means, the redox-active material used for electrical charge storage in the negative electrode is a material which exhibits a redox reaction at a lower electrochemical potential than the polymer of this invention. Preference is given to those materials selected, from the group consisting of carbon materials, which are especially selected, from the group consisting of graphite, graphene, carbon black, carbon fibres, carbon nanofibres, metals or alloys, which are especially selected from the group consisting of lithium, sodium, magnesium, lithium-aluminium, Li—Si, Li—Sn, Li—Ti, Si, SiO, $SiO_2$, Si—$SiO_2$ complex, Zn, Sn, SnO, $SnO_2$, PbO, $PbO_2$, GeO, $GeO_2$, $WO_2$, $MoO_2$, $Fe_2O_3$, $Nb_2O_5$, $TiO_2$, $Li_4Ti_5O_{12}$, and $Li_2Ti_3O_7$, and organic redox-active materials. Examples of organic redox-active materials are compounds having a stable organic radical, compounds having an organosulphur unit, having a quinone structure, compounds having a dione system, conjugated carboxylic acids and salts thereof, compounds having a phthalimide or naphthalimide structure, compounds having a disulphide bond and compounds having a phenanthrene structure and derivatives thereof. If an abovementioned redox-active oligomeric or polymeric compound is used in the negative electrode, this compound may also be a composite, i.e. a composition, consisting of this oligomeric or polymeric compound, a conductivity additive and a binder additive in any ratio. The conductivity additive in this case too is especially at least one electrically conductive material, preferably selected from the group consisting of carbon materials, electrically conductive polymers, and especially carbon materials. Carbon materials are especially selected from the group consisting of carbon fibres, carbon nanotubes, graphite, carbon black, graphene, and are more preferably carbon fibres. Electrically conductive polymers are especially selected from the group consisting of polyanilines, polythiophenes, polyacetylenes, poly(3,4-ethylenedioxythiophene) polystyrenesulphonate (PEDOT:PSS), polyarcenes. Binder additives in this case too are especially materials having binder properties and are preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

This composite may, as described above, be present as a layer on a substrate through a known film-forming process with the aid of an electrode slurry.

FIGURES

FIG. 1 shows the cyclic voltammogram of 2 (1 mmolar in $CH_2Cl_2$ with 0.1 M $TBAPF_6$) at various scan rates (reported in $mVs^{-1}$). The x axis indicates the potential V, the y axis the current in mA.

Figure 2:
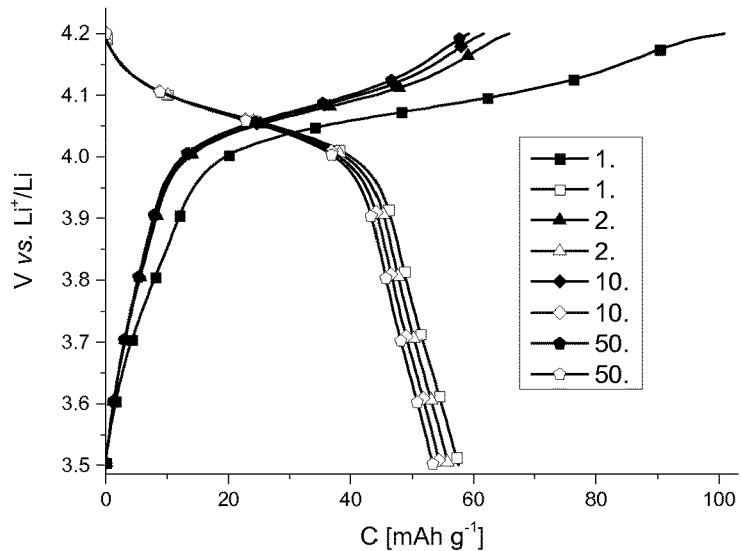

FIG. 2 indicates the measured voltages V (y axis) against the capacity (x axis) of an electrode according to the invention produced with 3 after 1 or 10 or 50 charge/discharge cycle(s) (charging rate=1 C, i.e. full charge within 60 minutes; section 4.1). The filled boxes in the diagram denote the charging cycles, the empty boxes the discharging cycles.

Figure 3:
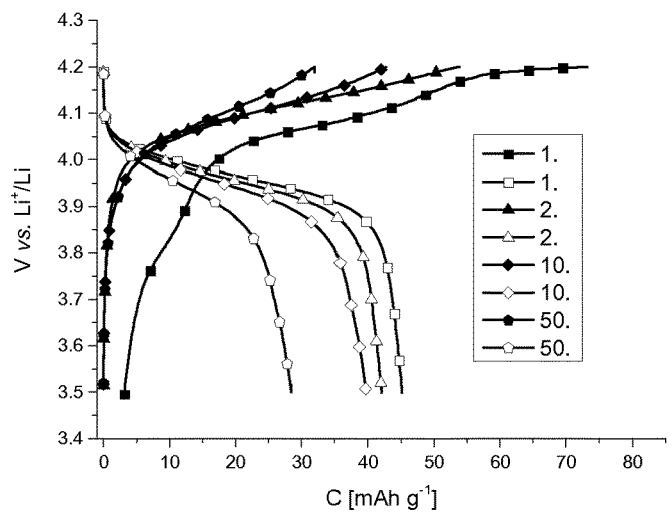

FIG. 3 indicates the measured voltages V (y axis) against the capacity (x axis) of an electrode not according to the invention produced with 13 after 1 or 10 or 50 charge-discharge cycle(s) (charging rate=1 C, i.e. full charge within 60 minutes; section 4.2). The filled boxes in the diagram denote the charging cycles, the empty boxes the discharging cycles.

The invention is to be illustrated in detail hereinafter by the working examples for preparation and use shown in the drawings, without being limited thereto.

EXAMPLES

1. General Remarks

1.1 Abbreviations

AIBN—azobis(isobutyronitrile); C—carbon particles; DMAP—dimethylaminopyridine; DMF—dimethylformamide; $NEt_3$—triethylamine; ov—overnight; $TBAClO_4$—tetrabutylammonium perchlorate; $TBAPF_6$—tetrabutylammonium hexafluorophosphate; THF—tetrahydrofuran; Tol.—toluene.

1.2 Test Methods $^1H$ and $^{13}C$ NMR spectra were recorded with a Bruker AC 300 (300 MHz) spectrometer at 298 K. For cyclic voltammetry and galvanostatic experiments, a Biologic VMP 3 potentiostat was available. Size exclusion chromatography was conducted on an Agilent 1200 series system (degasser: PSS, pump: G1310A, autosampler: G1329A, oven: Techlab, DAD detector: G1315D, RI detector: G1362A, eluent: DMAc+0.21% LiCl, 1 ml/min, temperature: 40° C., column: PSS GRAM guard/1000/30 Å).

2. Inventive Examples

2.1 I1: Synthesis and Polymerization of 2,2'-(((2,5-di-tert-butyl-1,4-phenylene)bis(oxy))bis(methylene))bis(oxirane) 2

2.1.1 Synthesis of 2,2'-(((2,5-di-tert-butyl-1,4-phenylene)bis(oxy))bis(methylene))bis(oxirane) 2

A 0.5 M solution of 2,5-di-tert-butylhydroquinone 1 (2.22 g, 10 mmol) in THF was added dropwise to an ice-cooled suspension of NaH (1 g, 25 mmol, 60% dispersion in mineral oil) in 10 ml of THF and, on completion of addition, the mixture was stirred at room temperature for another 1 hour. Subsequently, 5 mol % of tetrabutylammonium iodide (185 mg, 0.5 mmol) and epichlorohydrin (4.69 ml, 60 mmol) were added and the reaction mixture was stirred at 40° C. for 16 hours. The reaction was quenched with water and extracted with diethyl ether. The organic phase was dried with $MgSO_4$; the solvent was removed under reduced pressure. The residue was suspended in pentane, stirred at room temperature for 2 hours and then filtered. 2.84 g (8.5 mmol, 89%) 2 were obtained in the form of a white solid.

$^1H$ NMR ($CDCl_3$, 300 MHz, ppm): δ 6.74 (s, 2H), 4.13 (m, 2H), 3.90 (m, 2H), 3.31 (m, 2H), 2.84 (m, 2H), 2.70 (m, 2H), 1.30 (s, 18H).

FIG. 1 shows the cyclic voltammogram of 2 in $CH_2Cl_2$ (1 mmolar 2, 0.1 M $TBAClO_4$) at various scan rates.

2.1.2 Polymerization of 2,2'-(((2,5-di-tert-butyl-1,4-phenylene)bis(oxy))bis(methylene))bis(oxirane) 2 to give 3

2,2'-(((2,5-Di-tert-butyl-1,4-phenylene)bis(oxy))bis(methylene))bis(oxirane) 2 (22.07 g, 66 mmol) was dissolved in 66 ml of dry dichloromethane under an argon atmosphere. Subsequently, 1 mol % of water (11.9 mg, 0.66

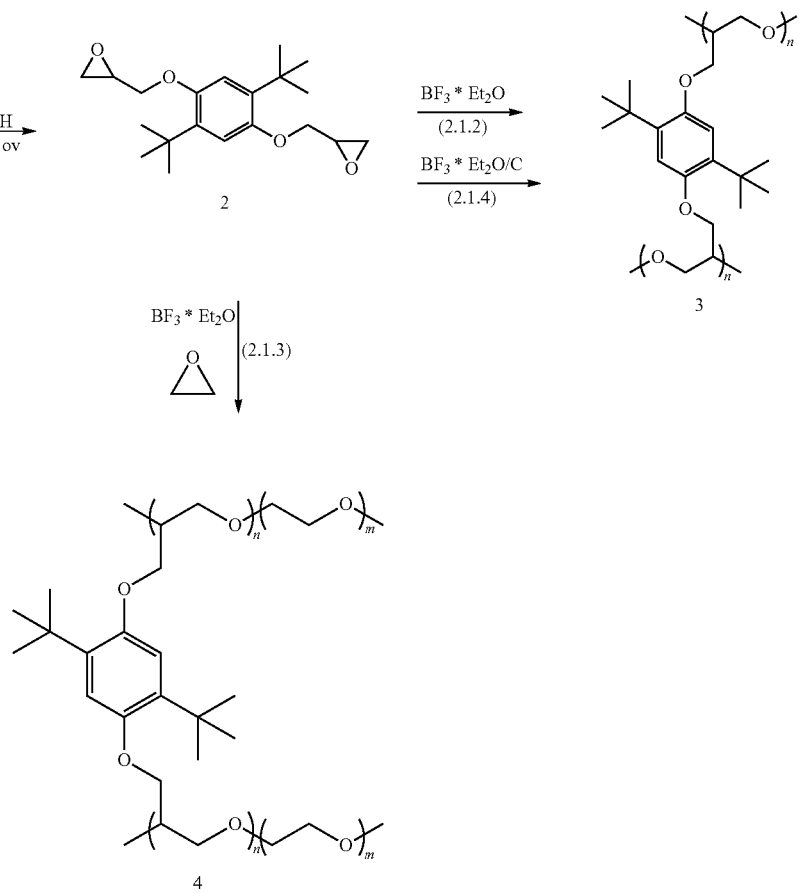

mmol) and 3 mol % of BF₃ etherate (281 mg, 1.98 mmol) were added. The reaction mixture was stirred by means of a mechanical stirrer for 16 hours and the gel obtained was transferred directly into a Soxhlet apparatus. It was extracted therein with acetonitrile and diethyl ether and then dried. This gives 18.2 g (82.5%) of 3 in the form of a white powder.

2.1.3 Copolymerization of 2,2'-(((2,5-di-tert-butyl-1,4-phenylene)bis(oxy))bis(methylene))bis(oxirane) 2 with ethylene oxide to give 4

2,2'-(((2,5-Di-tert-butyl-1,4-phenylene)bis(oxy))bis(methylene))bis(oxirane) 2 (1.14 g, 3.4 mmol) were dissolved in 50 ml of dry THF, transferred into a Büchi PicoClave Reaktor and cooled to −20° C. Subsequently, ethylene oxide (3 g, 0.0681 mmol) and potassium diphenylmethanide (206 mg, 1 mmol) were added. The reaction mixture was heated from −20 to 45° C. within 4 hours and kept at this temperature for 12 hours. The gel obtained was transferred directly into a Soxhlet apparatus. It was extracted therein with acetonitrile and tetrahydrofuran and then dried. This gives 4.0 g (93%) of 4 in the form of a white powder.

2.1.4 Polymerization of 2,2'-(((2,5-di-tert-butyl-1,4-phenylene)bis(oxy))bis(methylene))bis(oxirane) 2 in the presence of carbon to give 3

2,2'-(((2,5-Di-tert-butyl-1,4-phenylene)bis(oxy))bis(methylene))bis(oxirane) 2 (40 mg, 0.12 mmol) and 80 mg of Super P® were inertized and dispersed with 5 ml of dichloromethane. Subsequently, 5 mol % of BF₃ etherate (0.9 mg, 6 µmol) was added. The reaction mixture was stirred for 16 hours and the gel obtained was transferred directly into a Soxhlet apparatus. It was extracted therein with acetonitrile and diethyl ether and dichloromethane and then dried. This gives 112 mg polymerization product in the form of a black powder.

Elemental analysis: C, 90.96%, H, 2.85%, corresponds to about 31% polymer in the composite.

2.2 E2: Synthesis and Polymerization of 2-((2,5-di-tert-butyl-4-methoxyphenoxy)methyl)oxirane 6

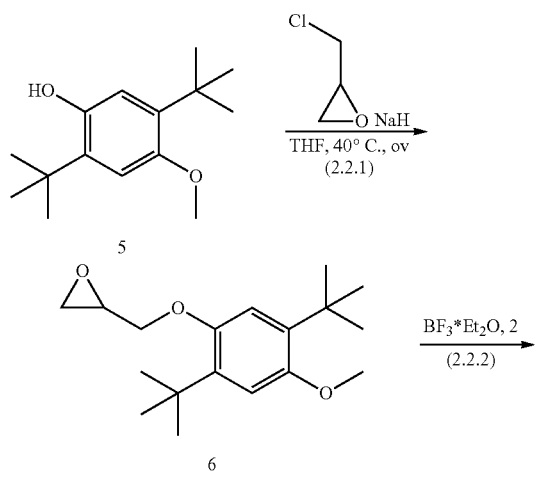

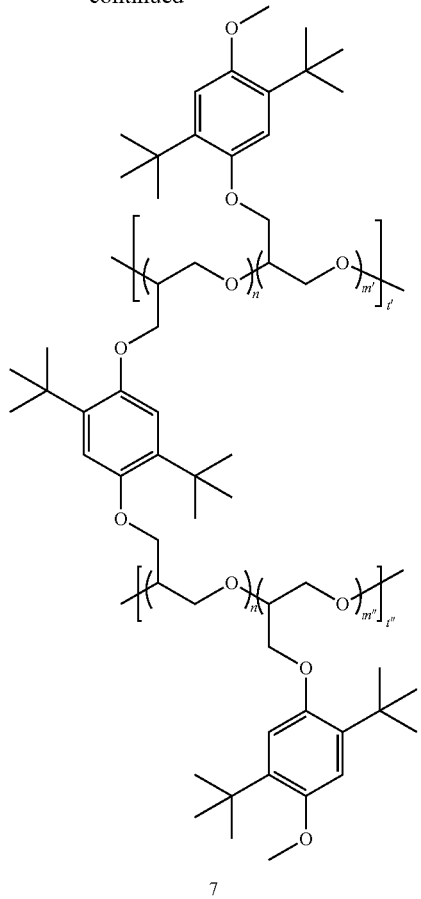

2.2.1 Synthesis of 2-((2,5-di-tert-butyl-4-methoxyphenoxy)methyl)oxirane 6

A 0.5 M solution of 2,5-di-tert-butyl-4-methoxyphenol 5 (2.36 g, 10 mmol) in THF was added dropwise to an ice-cooled suspension of NaH (600 mg, 15 mmol, 60% dispersion in mineral oil) in 8 ml of THF and, on completion of addition, the mixture was stirred at room temperature for another 1 hour. Subsequently, 5 mol % of tetrabutylammonium iodide (185 mg, 0.5 mmol) and epichlorohydrin (1.59 ml, 20 mmol) were added and the reaction mixture was stirred at 40° C. for 16 hours. The reaction was quenched with water and extracted with diethyl ether. The organic phase was dried with MgSO₄; solvent was removed under reduced pressure. The residue was suspended in pentane, stirred at room temperature for 2 hours and then filtered. 2.40 g (8.2 mmol, 82%) 6 were obtained in the form of a white solid.

¹H NMR (CDCl₃, 300 MHz, ppm): δ 6.70 (s, 1H), 6.65 (s, 1H), 4.13 (m, 1H), 3.90 (m, 1H), 3.68 (s, 3H), 3.31 (m, 1H), 2.84 (m, 1H), 2.70 (m, 1H), 1.26 (s, 18H).

2.2.2 Copolymerization of 2-((2,5-di-tert-butyl-4-methoxyphenoxy)methyl)oxirane 6 with 2 to give 7

2-((2,5-Di-tert-butyl-4-methoxyphenoxy)methyl)oxirane 6 (877 mg, 3 mmol) and 2,2'-(((2,5-di-tert-butyl-1,4-phenylene)bis(oxy))bis(methylene))bis(oxirane) 2 (167 mg, 0.5 mmol) were dissolved in 3.5 ml of dry dichloromethane under an argon atmosphere. Subsequently, 3 mol % of BF₃ etherate (15 mg, 0.11 mmol) was added and the mixture was stirred at room temperature for 14 hours. The gel obtained was transferred directly into a Soxhlet apparatus. It was extracted therein with acetonitrile and diethyl ether and then dried. This gave 835 mg (80%) of 7 in the form of a white powder.

3. Comparative Examples

3.1C1: Synthesis and Polymerization of ((2,5-di-tert-butyl-1,4-phenylene)bis(oxy))bis(propane-3,1-diyl)bis(2-methyl acrylate) 12

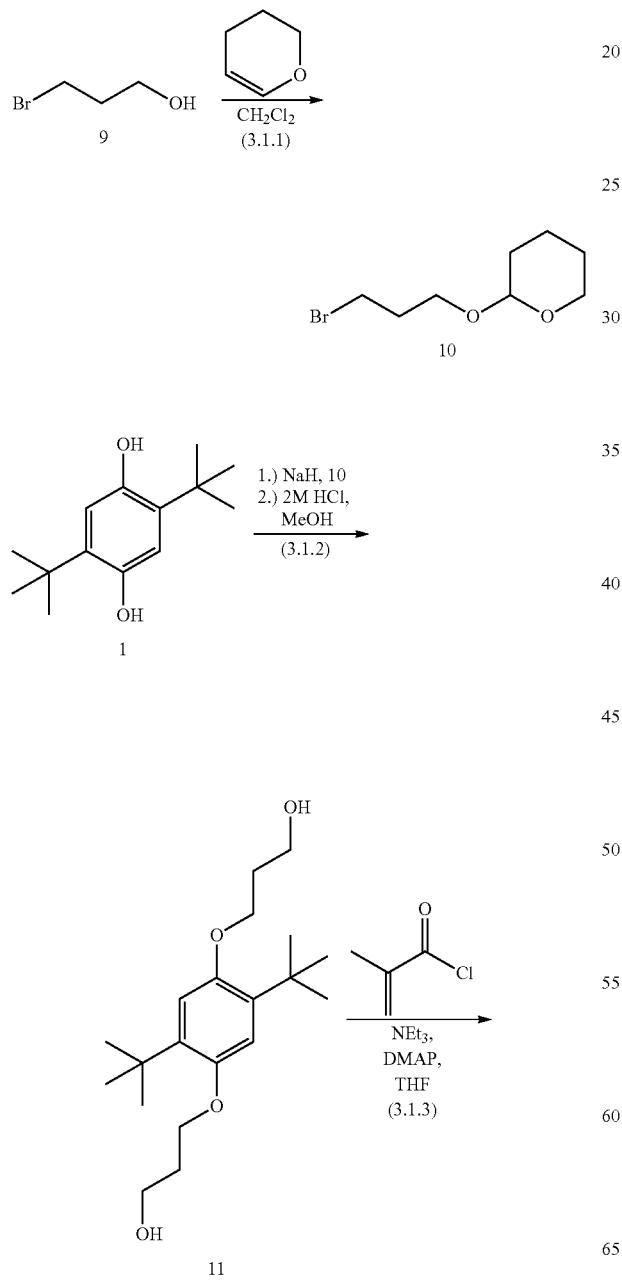

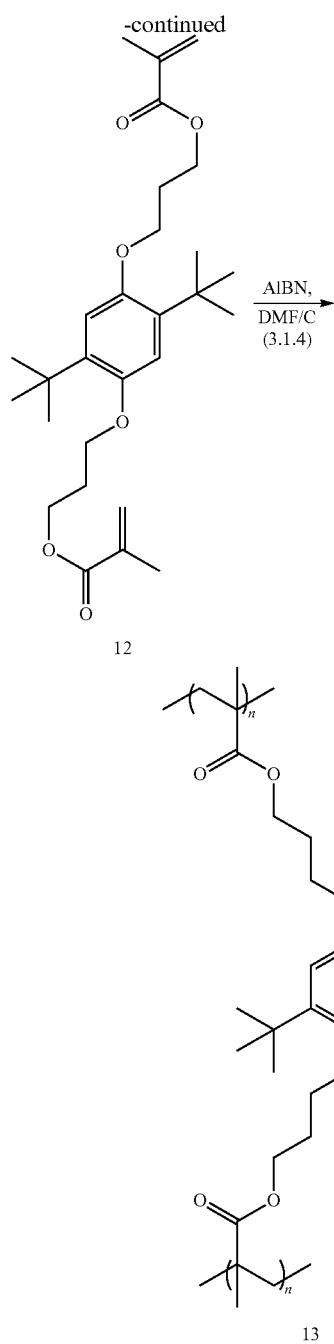

3.1.1 Synthesis of 2-(3-bromopropoxy)tetrahydro-2H-pyran 10

Stirred into a 0.5 M solution of 1-bromo-3-hydroxypropane 9 (10 g, 72 mmol) in CH₂Cl₂ were p-toluenesulphonic acid hydrate (1.37 g, 7.2 mmol) and dihydropyran (9.8 ml, 107.9 mmol), and the mixture was stirred at room temperature for 16 hours. The reaction was extracted with water. The organic phase was dried with MgSO₄, the solvent was removed under reduced pressure and the residue was purified by means of vacuum distillation. 12.2 g (54.7 mmol, 76%) of 10 were obtained as a colourless oil.

¹H NMR (CDCl₃, 300 MHz, ppm) δ 4.52 (s, 1H), 3.78 (m, 2H), 3.46 (m, 4H), 2.05 (m, 2H), 1.68 (m, 2H), 1.46 (m, 4H).

3.1.2 Synthesis of 3,3'-((2,5-di-tert-butyl-1,4-phenylene)bis(oxy))bis(propan-1-ol) 11

To a 0.9 M solution of 1 (1 g, 4.5 mmol) in THF was added dropwise an ice-cooled suspension of NaH (450 mg, 11.2 mmol, 60% dispersion in mineral oil) in 10 mL of THF and, on completion of addition, the mixture was stirred at room temperature for another 2 hours. Subsequently, 10 (5.02 g, 22.5 mmol) was added and the reaction mixture was stirred at 50° C. for 24 hours. The reaction was quenched with water and extracted with dichloromethane. The organic phase was dried with MgSO₄ and the solvent was removed under reduced pressure. Without further purification, the residue was taken up in 50 ml of methanol, and 20 ml of 2 M HCl were added. After detachment of the protecting group (monitoring by TLC), the product was extracted with dichloromethane and dried over MgSO₄, and the solvent was removed under reduced pressure. The residue was purified by means of column chromatography (silica gel, hexane/ethyl acetate, 1:1). 853 mg (2.5 mmol, 56%) of 11 were obtained as a white solid.

¹H NMR (CDCl₃, 300 MHz, ppm): δ 6.85 (s, 2H), 4.10 (t, 4H), 3.92 (t, 4H), 2.09 (m, 4H), 1.37 (s, 18H).

3.1.3 Synthesis of ((2,5-di-tert-butyl-1,4-phenylene)bis(oxy))bis(propane-3,1-diyl)-bis(2-methyl acrylate) 12

11 (505 mg, 1.5 mmol) and DMAP (18 mg, 0.15 mmol) were inertized. 10 ml of dry THF, triethylamine (820 µl, 5.9 mmol) and methacryloyl chloride (570 µl, 5.9 mmol) were added while cooling and the mixture was stirred at room temperature for 16 hours. The reaction was quenched with water and extracted with dichloromethane. The organic phase was dried with MgSO₄ and the solvent was removed under reduced pressure. The residue was purified by means of column chromatography (silica gel, hexane/ethyl acetate, 4:1). 565 mg (1.2 mmol, 80.6%) of 12 were obtained as a white solid.

¹H NMR (CDCl₃, 300 MHz, ppm): δ 6.83 (s, 2H), 6.12 (s, 2H), 5.56 (s, 2H), 4.39 (t, 4H), 4.07 (t, 4H), 2.21 (m, 4H), 1.95 (s, 6H), 1.37 (s, 18H).

3.1.4 Polymerization of ((2,5-di-tert-butyl-1,4-phenylene)bis(oxy))bis(propane-3,1-diyl)bis(2-methyl acrylate) 12 to give 13 in the presence of carbon Monomer 12 (40 mg, 0.08 mmol), AIBN (0.7 mg, 0.004 mmol) and 80 mg of SuperP® (carbon particles, acquired from Sigma Aldrich) were inertized. Subsequently, 2.5 ml of dry toluene were added and the reaction was stirred at 80° C. for 54 hours. The composite was precipitated and washed in methanol. This gave 105 mg of 13 in the form of a black solid.

Elemental analysis: C, 92.06%, H, 2.38%, corresponds to about 27% polymer in the composite.

3.2 C2: Synthesis and Polymerization of 3-(2,5-di-tert-butyl-4-methoxyphenoxy)propyl methacrylate 15

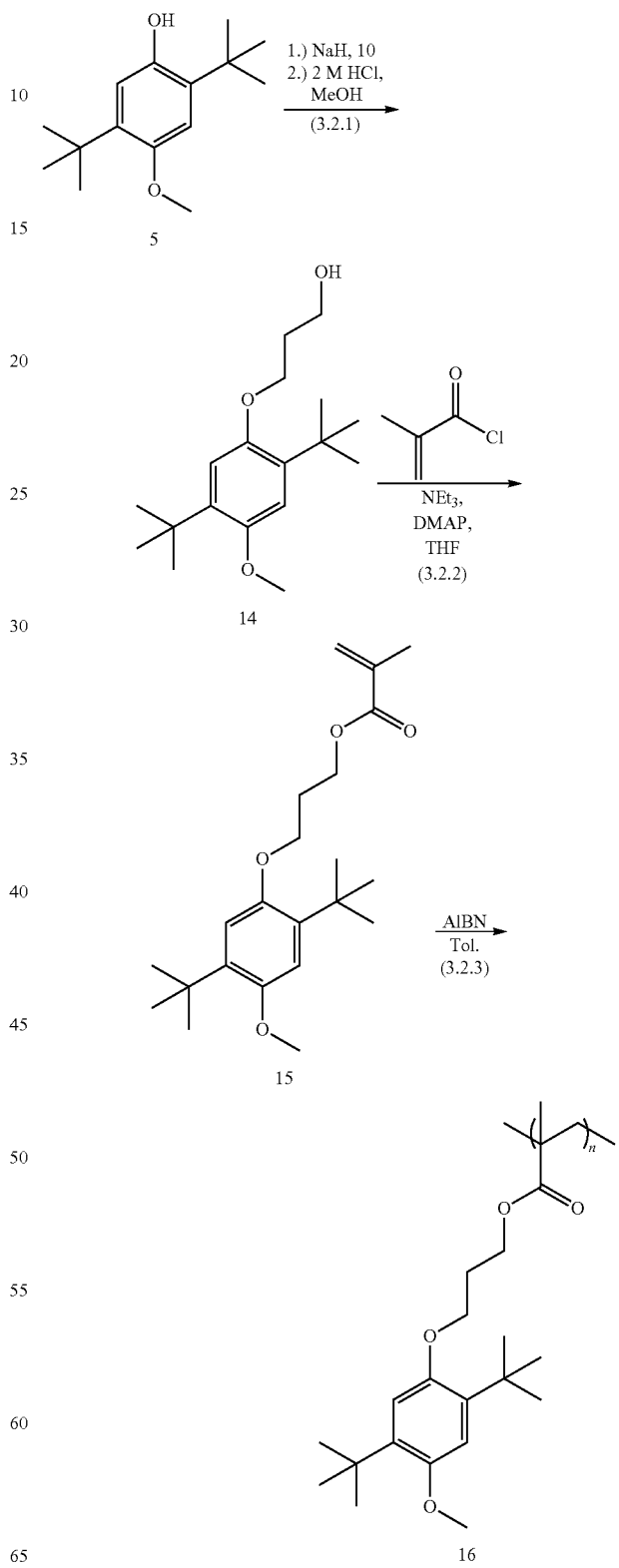

3.2.1 Synthesis of 3-(2,5-di-tert-butyl-4-methoxyphenoxy)propan-1-ol 14

A 0.8 M solution of 5 (2 g, 8.5 mmol) in THF was added dropwise to an ice-cooled suspension of NaH (507 mg, 12.7 mmol, 60% dispersion in mineral oil) in 10 mL of THF and, on completion of addition, the mixture was stirred at room temperature for another 2 hours. Subsequently, 10 (5.66 g, 25.4 mmol) was added and the reaction mixture was stirred at 50° C. for 48 hours. The reaction was quenched with water and extracted with dichloromethane. The organic phase was dried with $MgSO_4$ and the solvent was removed under reduced pressure. The residue was taken up in 50 ml of methanol, and 20 ml of 2 M HCl were added. After detachment of the protecting group, the product was extracted with dichloromethane and dried over $MgSO_4$, and the solvent was removed under reduced pressure. The residue was purified by means of gel filtration (silica gel, hexane/ethyl acetate, 4:1). 1.62 g (5.5 mmol, 65%) of 14 were obtained as a white solid.

$^1$H NMR ($CDCl_3$, 300 MHz, ppm): δ 6.84 (2H), 4.11 (t, 2H), 3.92 (t, 2H), 3.81 (s, 3H), 2.09 (m, 2H), 1.37 (18H).

3.2.2 Synthesis of 3-(2,5-di-tert-butyl-4-methoxyphenoxy)propyl methacrylate 15

14 (500 mg, 1.7 mmol) and DMAP (20.8 mg, 0.17 mmol) were inertized 10 ml of dry THF, triethylamine (940 µl, 6.8 mmol) and methacryloyl chloride (660 µl, 6.8 mmol) were added while cooling and the mixture was stirred at room temperature for 16 hours. The reaction was quenched with water and extracted with dichloromethane. The organic phase was dried with $MgSO_4$ and the solvent was removed under reduced pressure. The residue was purified by means of column chromatography (silica gel, hexane/ethyl acetate, 4:1). 545 mg (1.5 mmol, 88.5%) of 15 were obtained as a white solid.

$^1$H NMR ($CDCl_3$, 300 MHz, ppm): δ 6.83 (2H), 6.12 (s, 1H), 5.56 (s, 1H), 4.39 (t, 2H), 4.07 (t, 2H), 3.80 (s, 3H), 2.21 (m, 2H), 1.95 (s, 3H), 1.36 (18H).

3.2.3 Polymerization of 3-(2,5-di-tert-butyl-4-methoxyphenoxy)propyl methacrylate 15 to give 16

A 0.5 M solution of 15 (100 mg, 0.275 mmol) in dry toluene and AIBN (1.72 mg, 0.13 mmol) was degassed with argon for 90 min. The degassed mixture was stirred at 80° C. for 16 hours. The polymer was precipitated in methanol. This gave 65 mg (0.18 mmol, 64.5%) of 16 as a white solid.

4. Production of the Electrodes

4.1 Production of an Electrode Comprising 4 (Inventive Example)

3 (prepared as described in section 2.1.4) was processed in a mortar to give a fine powder. Subsequently added to 90 mg of 3 and 10 mg of poly(vinylidene fluoride) (PVDF; Sigma Aldrich as binder additive) was 1 ml of NMP (N-methyl-2-pyrrolidone), and the mixture was mixed in a mortar for five minutes until a homogeneous paste formed. This paste was applied to aluminium foil (15 µm, MIT Corporation) using a doctor blade method or with the aid of coating bar and the electrode was dried at 45° C. under reduced pressure for 16 hours. The proportion of the active material on the electrodes was determined on the basis of the masses of dried electrodes. The button cells (2032 type) were constructed under an argon atmosphere. Suitable electrodes were punched out with the aid of an MIT Corporation Precision Disc Cutter (diameter 15 mm). The electrode being used as cathode was positioned at the base of the button cell and separated from the lithium anode with the aid of a porous polypropylene membrane (Celgard, MIT Corporation). Subsequently positioned atop the lithium anode were a stainless steel weight (diameter: 15.5 mm, thickness: 0.3 mm, MIT Corporation) and a stainless steel spring (diameter: 14.5 mm, thickness: 5 mm). The button cell was filled with electrolyte (EC, DMC 3/7, 0.5 M $LiClO_4$) and covered with the lid before being sealed with an electrical compression machine (MIT Corporation MSK-100D). The battery shows a charge plateau at 4.1V and a discharge plateau at 4.0V. In the first discharge cycle, the battery shows a capacity of 58 mAh/g (71% of the theoretically possible capacity); after 50 charge/discharge cycles, the battery shows a capacity of 53 mAh/g (FIG. 2).

4.2 Production of an Electrode Comprising 13 (Comparative Example)

13 (prepared as described in section 3.1.4) was processed in a mortar to give a fine powder. Subsequently added to 90 mg of 13 and 10 mg of poly(vinylidene fluoride) (PVDF; Sigma Aldrich as binder additive) was 1 ml of NMP (N-methyl-2-pyrrolidone), and the mixture was mixed in a mortar for five minutes until a homogeneous paste formed. This paste was applied to aluminium foil (15 µm, MIT Corporation) using a doctor blade method with the aid of coating bar and the electrode was dried at 45° C. under reduced pressure for 16 hours. The proportion of the active material on the electrodes was determined on the basis of the masses of dried electrodes. The button cells (2032 type) were constructed under an argon atmosphere. Suitable electrodes were punched out with the aid of an MIT Corporation Precision Disc Cutter (diameter 15 mm). The electrode being used as cathode was positioned at the base of the button cell and separated from the lithium anode with the aid of a porous polypropylene membrane (Celgard, MIT Corporation). Subsequently positioned atop the lithium anode were a stainless steel weight (diameter: 15.5 mm, thickness: 0.3 mm, MIT Corporation) and a stainless steel spring (diameter: 14.5 mm, thickness: 5 mm). The button cell was filled with electrolyte (EC, DMC 3/7, 0.5 M $LiClO_4$) and covered with the lid before being sealed with an electrical compression machine (MIT Corporation MSK-100D).

In the first discharge cycle, the battery shows a capacity of 45 mAh/g (80% of the theoretically possible capacity): after 50 charge/discharge cycles, the battery shows a capacity of 29 mAh/g (FIG. 3).

5. Results

It is clear from the comparison of FIG. 2 with FIG. 3 that the polymer electrodes of the invention have both a higher discharge voltage and discharge capacity and consequently a much higher specific energy compared to those obtained in the prior art. This effect was observed over several charge/discharge cycles. In addition, the polymers according to the invention exhibited a smaller drop in capacity on undergoing several charge/discharge cycles and could be produced in a much less resource-intensive manner.

The invention claimed is:

1. A polymer comprising
mutually linked repeat units of the chemical structure (I), wherein the number of repeat units of the chemical structure (I) in the polymer is from 4 to 5000, or
mutually linked repeat units of the chemical structure (II), wherein the number of repeat units of the chemical structure (II) in the polymer is from 4 to 5000:

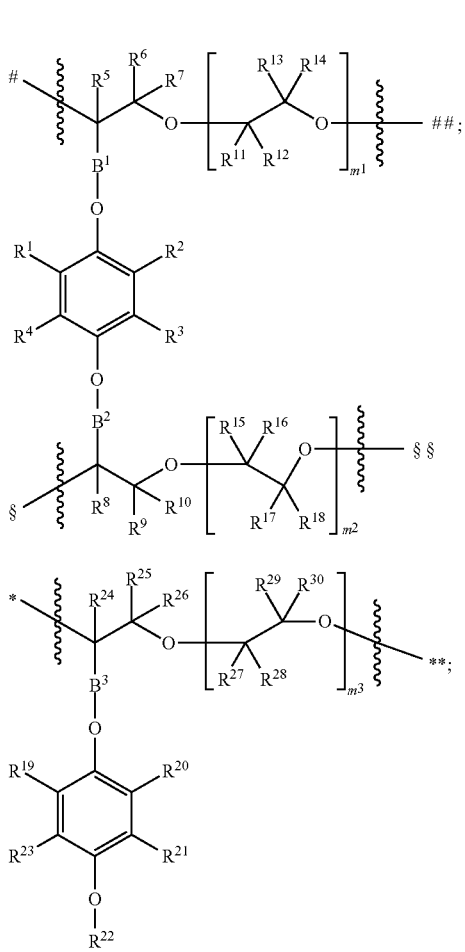

wherein
$m^1$, $m^2$, $m^3$ are each independently an integer of from 0 to 5000,
the repeat units of the chemical structure (I) within the polymer are the same or different from one another,
the repeat units of the chemical structure (II) within the polymer are the same or different from one another,
the repeat units of the chemical structure (I) within the polymer are joined to one another in such a way that the bond identified by "# #" in a particular repeat unit is joined by the bond identified by "#" in the adjacent repeat unit and the bond identified by "§ §" in a particular repeat unit is joined by the bond identified by "§" in the adjacent repeat unit,
the repeat units of the chemical structure (II) within the polymer are joined to one another in such a way that the bond identified by "*" in a particular repeat unit is joined by the bond identified by "**" in the adjacent repeat unit,
the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{23}$, $R^{24}$, $R^{25}$, $R^{26}$, $R^{27}$, $R^{28}$, $R^{29}$, $R^{30}$ radicals are each independently selected from the group consisting of hydrogen, and alkyl group having 1 to 8 carbon atoms,
$R^{22}$ is an alkyl group having 1 to 8 carbon atoms,
the $R^{11}$, $R^{13}$, $R^{15}$, $R^{17}$ radicals are also each optionally independently a group of the structure (III):

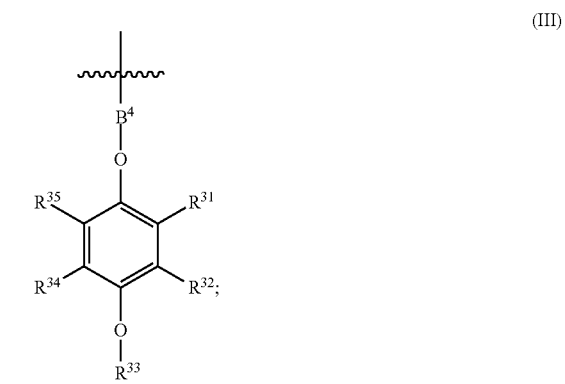

wherein the $R^{31}$, $R^{32}$, $R^{34}$, $R^{35}$ radicals are each independently selected from the group consisting of hydrogen, and alkyl group having 1 to 8 carbon atoms,
$R^{33}$ is an alkyl group having 1 to 8 carbon atoms,
$R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ are each also optionally selected from the group consisting of nitro group, —CN, —F, —Cl, —Br, —I, and —O—$R^{40}$ wherein $R^{40}$ is an alkyl group having 1 to 8 carbon atoms, and
$B^1$, $B^2$, $B^3$, $B^4$ are independently selected from the group consisting of
direct bond, and
&-$(O)_{p1}$—[C=O]$_{p2}$—$(O)_{p3}$-$B^5$-&&, and
wherein p1, p2, p3 are each 0 or 1, with the proviso that it is not simultaneously true that p1=p3=1 and p2=0, and
$B^5$ is an alkylene group having 1 to 30 carbon atoms.

2. The polymer according to claim 1,
wherein
$R^1$=$R^3$,
$R^2$=$R^4$,
$R^{19}$=$R^{21}$,
$R^{20}$=$R^{23}$,
$R^{31}$=$R^{34}$, and
$R^{32}$=$R^{35}$.

3. The polymer according to claim 2, wherein
$R^1$=$R^3$=H,
$R^2$=$R^4$=alkyl group having 1 to 8 carbon atoms,
$R^{19}$=$R^{21}$=H, $R^{20}$=$R^{23}$=alkyl group having 1 to 8 carbon atoms,
$R^{31}$=$R^{34}$=H,
$R^{32}$=$R^{35}$=alkyl group having 1 to 8 carbon atoms and
$B^1$, $B^2$, $B^3$, $B^4$ are each independently selected from the group consisting of direct bond, methylene, ethylene, n-propylene, and &-$B^5$—CH$_2$-&&, and
$B^5$=1, 4-phenylene.

4. The polymer according to claim 3, wherein
$R^1$=$R^3$=H,
$R^2$=$R^4$=alkyl group having 1 to 6 carbon atoms,
$R^{19}$=$R^{21}$=H,
$R^{20}$=$R^{23}$=alkyl group having 1 to 6 carbon atoms,
$R^{31}$=$R^{34}$=H, and
$R^{32}$=$R^{35}$=alkyl group having 1 to 6 carbon atoms.

5. The polymer according to claim 4, wherein
$R^1=R^3=H$,
$R^2=R^4$=tert-butyl group,
$R^{19}=R^{21}=H$,
$R^{20}=R^{23}$=tert-butyl group,
$R^{31}=R^{34}=H$, and
$R^{32}=R^{35}$=tert-butyl group.

6. An electrical charge storage, comprising:
a redox-active electrode material which comprises the polymer according to claim 1.

7. An electrical charge storage, the comprising:
a redox-active electrode material made from an electrode slurry which comprises the polymer according to claim 1.

\* \* \* \* \*